(12) United States Patent
Miyamoto et al.

(10) Patent No.: US 10,721,367 B2
(45) Date of Patent: Jul. 21, 2020

(54) RECORDING APPARATUS

(71) Applicant: SEIKO EPSON CORPORATION, Tokyo (JP)

(72) Inventors: Shintaro Miyamoto, Shiojiri (JP); Hisayuki Akahane, Matsumoto (JP); Katsumi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/232,754

(22) Filed: Dec. 26, 2018

(65) Prior Publication Data
US 2019/0199872 A1 Jun. 27, 2019

(30) Foreign Application Priority Data
Dec. 27, 2017 (JP) .................................. 2017-251966

(51) Int. Cl.
H04N 1/40 (2006.01)
H04N 1/00 (2006.01)
B41J 11/58 (2006.01)

(52) U.S. Cl.
CPC .......... H04N 1/00559 (2013.01); B41J 11/58 (2013.01); H04N 1/00604 (2013.01)

(58) Field of Classification Search
CPC .. H04N 1/00559; H04N 1/00604; B41J 11/58
USPC ....... 358/401, 400, 471, 496, 497, 498, 1.12
See application file for complete search history.

(56) References Cited

U.S. PATENT DOCUMENTS

| 6,057,936 | A | 5/2000 | Obara et al. | |
| 6,728,511 | B2 * | 4/2004 | Watanabe | G03G 15/6552 399/107 |
| 8,517,373 | B2 * | 8/2013 | Harada | B65H 3/0684 271/117 |
| 2004/0114958 | A1 * | 6/2004 | Katsuyama | G03G 15/6552 399/107 |
| 2006/0182462 | A1 * | 8/2006 | Imada | G03G 15/605 399/107 |
| 2012/0193863 | A1 * | 8/2012 | Harada | B65H 3/0684 271/110 |
| 2016/0212284 | A1 * | 7/2016 | Nagasaki | H04N 1/00559 |
| 2016/0316084 | A1 * | 10/2016 | Nakajima | H04N 1/00559 |

FOREIGN PATENT DOCUMENTS

JP 10-301349 A 11/1998

* cited by examiner

*Primary Examiner* — Cheukfan Lee
(74) *Attorney, Agent, or Firm* — Workman Nydegger

(57) ABSTRACT

A recording apparatus including: a lower unit having a recording section; and an upper unit having a document tray and a reading means that reads an image in a document, the upper unit being disposed above the lower unit, wherein the upper unit is configured such that an apparatus depth direction is a main scan direction for reading an image in the document and an apparatus width direction is a sub-scan direction for reading an image in the document, the lower unit includes support sections that stand upward on both ends in the apparatus width direction to support both ends of the upper unit in a long side direction, and the document tray included in the upper unit is made of a rigid member and part of the document tray is located above the support sections.

12 Claims, 29 Drawing Sheets

FIG. 1
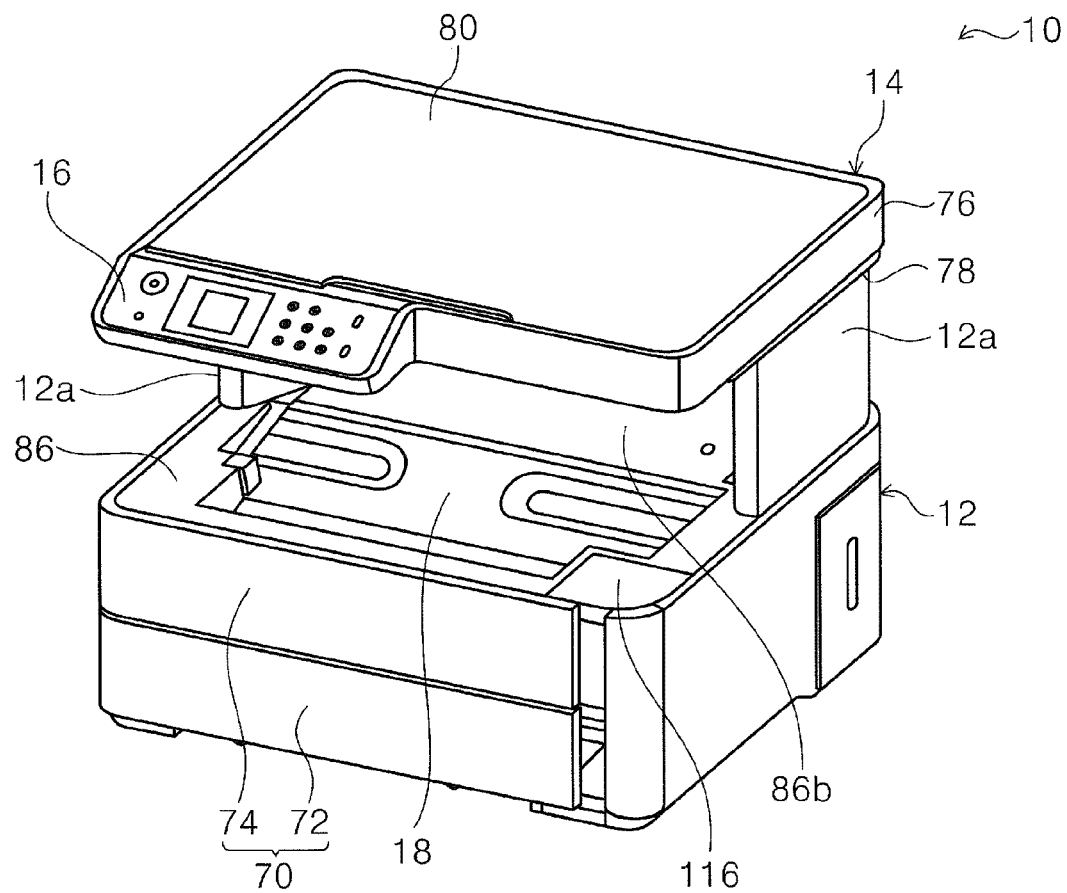
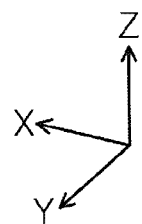

FIG. 21
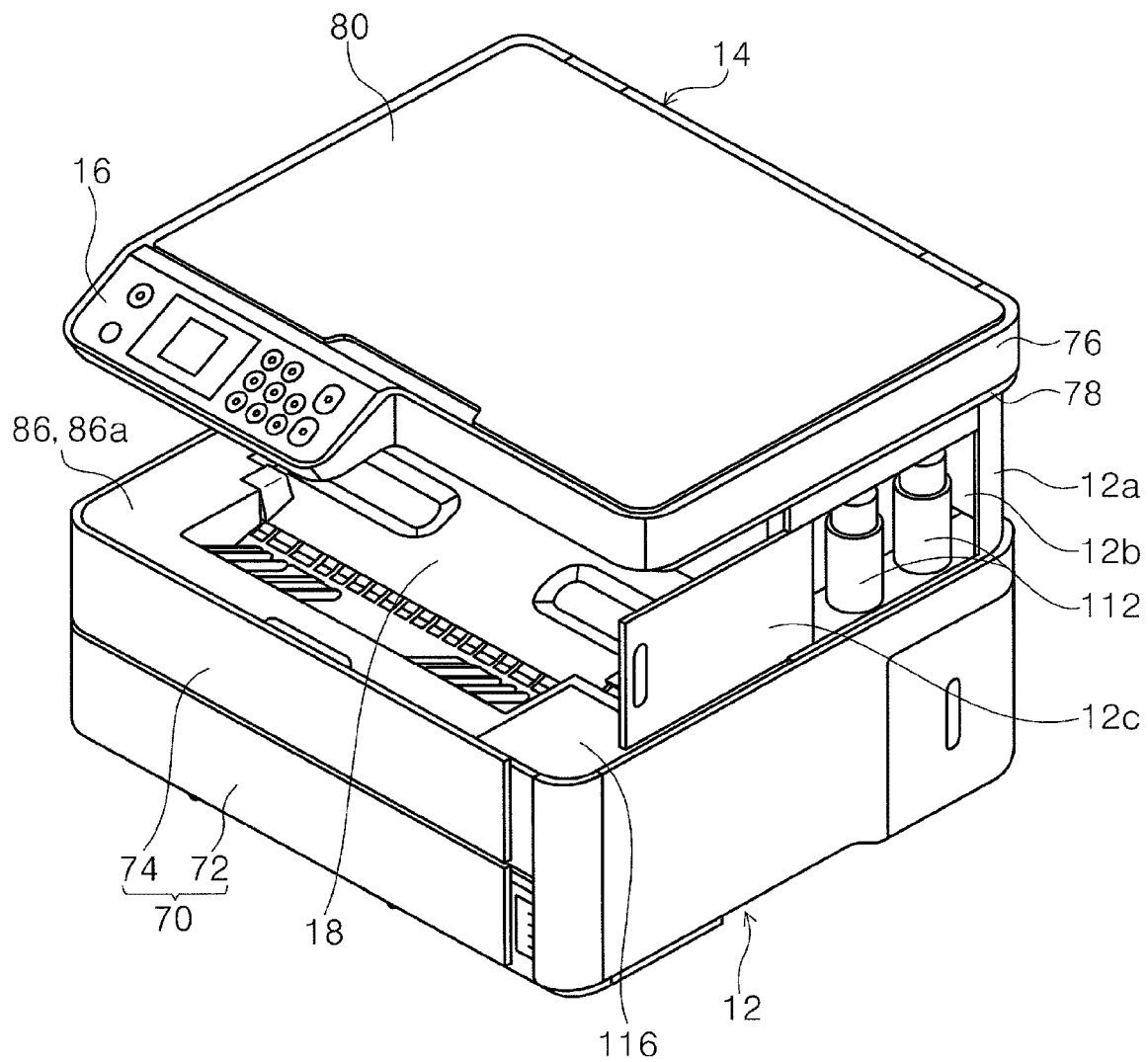
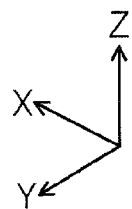

RECORDING APPARATUS

BACKGROUND

1. Technical Field

The present invention relates to a recording apparatus which includes a lower unit having a recording section that performs recording onto a medium, and an upper unit having a document tray on which a document is placed and a reading means that reads an image in a document placed on the document tray, the upper unit being provided above the lower unit.

2. Related Art

There have been known multi-functional machines, which integrate printer and scanner. JP-A-10-301349 is an example of related art. An image forming apparatus described in JP-A-10-301349 includes a scanner main body disposed above a printer main body. More specifically, a long side direction (direction along the long side) of paper sheet is defined as an apparatus depth direction, and a short side direction (direction along the short side) of paper sheet is defined as an apparatus width direction, and the long side of the scanner main body is supported by the left and right supporting wall of the printer main body.

In the image forming apparatus described in the JP-A-10-301349, a sheet output space is formed under the scanner main body. Since the long side of the scanner main body is supported by the left and right supporting walls, the sheet output space has a narrow horizontal width, leading to a disadvantage that the outputted paper sheet is not easily taken out. In particular, a user has to insert his/her hand into the depth of the sheet output space to take out a small-sized paper sheet. Therefore, in the structure that supports the long side of the scanner main body by the left and right supporting wall, taking out an outputted paper sheet is further difficult. In this viewpoint, it is preferred to support the short side of the scanner main body, rather than the long side as the image forming apparatus disclosed in JP-A-10-301349.

However, in this configuration, a distance between the left and right support positions is increased, which may cause sag of the scanner main body. For example, when the housing constituting a lower part of the scanner main body sags, a reading means cannot smoothly move or is detached from the underside of the document tray, leading to a failure in appropriate reading. On the other hand, if the rigidity of the housing constituting a lower part of the scanner main body is increased to avoid such a problem, the weight of the apparatus increases, leading to an increase in the number of components.

SUMMARY

An advantage of some aspects of the invention is that, in the configuration in which the long side direction of a target document for reading is the apparatus width direction and the short side direction is the apparatus depth direction, deformation of the scanner main body is appropriately reduced while preventing in increase of the number of components.

A recording apparatus according to an aspect of the invention includes: a lower unit having a recording section that performs recording onto a medium; and an upper unit having a document tray on which a document is placed and a reading means that reads an image in a document placed on the document tray, the upper unit being disposed above the lower unit, wherein the upper unit is configured such that a short side direction of the document is an apparatus depth direction and a long side direction of the document is an apparatus width direction, the lower unit includes support sections that stand upward on both ends in the apparatus width direction to support both ends of the upper unit in a long side direction, and the document tray included in the upper unit is made of a rigid member and part of the document tray is located above the support sections.

According to this aspect, since the lower unit includes the support sections that stand on both ends in the apparatus width direction to support the ends of the upper unit in the long side direction, and the document tray included in the upper unit is made of a rigid member and part of the document tray is located above the support section, the rigidity of the document tray is used for supporting the upper unit. Accordingly, the upper unit can be appropriately prevented from being deformed while preventing an increase in the number of components.

The term "part of the document tray is located above the support section" as used herein refers to that the support section and part of the document tray are overlapped when the apparatus is viewed from vertically above. In other words, the support section and part of the document tray are located at the same position in the apparatus width direction, and, the support section and part of the document tray are located at the same position in the apparatus depth direction. Further, the rigid member herein refers to a member having transparency required for reading a document image and resistance to dimensional change (deformation) to bending or twisting force, and includes, for example, a glass, or a member made of resin material or the like, without limited to glass.

According to the aspect, the upper unit may include a lower housing that houses the reading means and supports the document tray, the lower housing may include a support rib that supports the document tray, and the support rib may be interposed between the document tray and the support section.

According to this aspect, the upper unit may include a lower housing that houses the reading means and supports the document tray, the lower housing may include a support rib that supports the document tray, and the support rib may be interposed between the document tray and the support section. Accordingly, a load applied to the document tray can be readily transmitted to the support sections to thereby reduce deformation of the upper unit in more appropriate manner.

According to the aspect, the lower housing may include an auxiliary rib having a height lower than that of the support rib and connected to the support rib. According to this aspect, since the lower housing may include an auxiliary rib having a height lower than that of the support rib and connected to the support rib, the support rib does not easily collapse, and can more reliably support the document tray.

According to the aspect, the lower housing may include a guide rib that guides the reading means in the apparatus width direction, and a rack that extends along the guide rib, and at least one of the guide rib and the rack may be connected to at least one of the support rib and the auxiliary rib.

According to this aspect, the lower housing may include a guide rib that guides the reading means in the apparatus width direction, and a rack that extends along the guide rib, and at least one of the guide rib and the rack may be connected to at least one of the support rib and the auxiliary rib. Accordingly, the rigidity of the lower housing can be further improved, and thus deformation of the upper unit can be more reliably reduced.

According to the aspect, the lower housing may include a guide rib that guides the reading means in the apparatus width direction, and a rack that extends along the guide rib, and at least one of part of the guide rib and part of the rack may be located above the support section.

According to this aspect, the lower housing may include a guide rib that guides the reading means in the apparatus width direction, and a rack that extends along the guide rib, and at least one of part of the guide rib and part of the rack may be located above the support section. Accordingly, the rigidity of the guide rib or the rack is used for supporting the upper unit. Thus, deformation of the upper unit can be more appropriately prevented. The term "at least one of part of the guide rib and part of the rack may be located above the support section" as used herein refers to that the support section and at least one of part of the guide rib and part of the rack are overlapped when the apparatus is viewed from vertically above. In other words, the support section and at least one of part of the guide rib and part of the rack are located at the same position in the apparatus width direction, and at the same position in the apparatus depth direction.

According to the aspect, a stand-by position of the reading means may be set in at least one of a pair of the support sections, and at least part of the reading means may be located above the support section when the reading means is in the stand-by position. According to this aspect, in the configuration in which at least part of the reading means is located above the support section when the reading means is located in the stand-by position, advantageous effects of the aspect can be obtained. The term "the reading means is located above the support section" as used herein refers to that the support section and at least part of the reading means are located at the same position in the apparatus width direction when the apparatus is viewed from vertically above, and at the same position in the apparatus depth direction.

According to the aspect, a cable that electrically connects the lower unit and the upper unit may be disposed in at least one of the pair of the support sections. According to this aspect, in the pair of the support section, the space in at least one of the pair of the support sections is used as a space that allows the cable for electrically connecting the lower unit and the upper unit to pass therethrough, and thus the apparatus can be down-sized.

According to the aspect, a housing space for an article may be provided in at least one of the pair of the support sections. According to this configuration, in the pair of the support sections, the space in at least one of the pair of the support sections may be used as a space that houses articles, and thus the space inside the support section can be effectively used.

According to the aspect, a motor that drives a movable section of at least one of the lower unit and the upper unit may be disposed in at least one of the pair of the support sections.

According to this configuration, in the pair of the support sections, the space in at least one of the pair of the support sections may be used as a space that houses the motor, and thus the apparatus can be down-sized.

BRIEF DESCRIPTION OF THE DRAWINGS

The invention will be described with reference to the accompanying drawings, wherein like numbers reference like elements.

FIG. 1 is an outer appearance perspective view of a printer according to the present embodiment.

FIG. 21 is a perspective view illustrating a configuration of the support section according to another embodiment.

DESCRIPTION OF EXEMPLARY EMBODIMENTS

Figure 2:
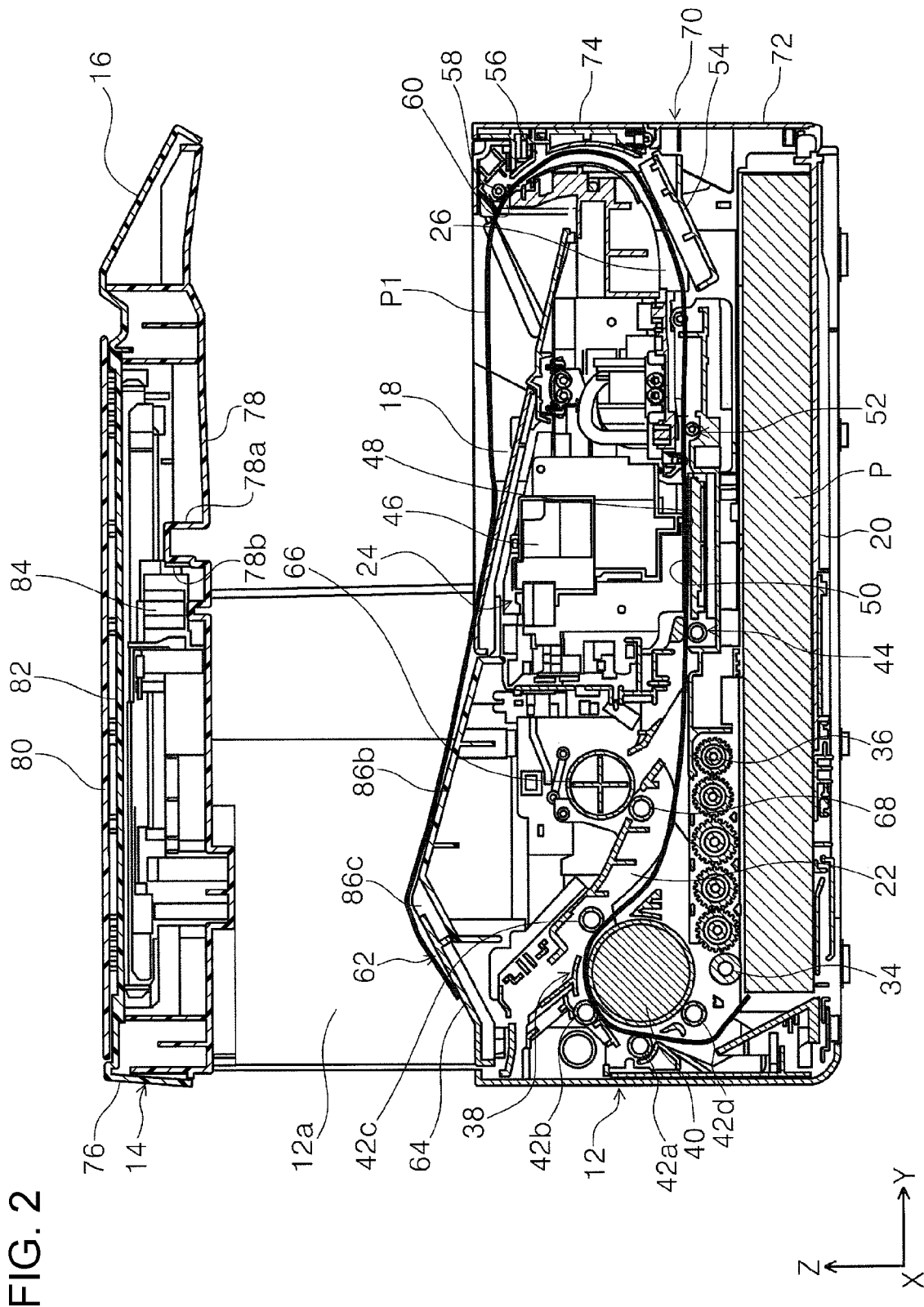
FIG. 2 is a side cross-sectional view illustrating a medium transport path of the printer according to the present embodiment.

With reference to the drawings, an embodiment of the invention will now be described. Throughout the embodiments, the same components are denoted by the same reference numerals and the description thereof is made only in the embodiment in which the component first appears in order to avoid duplication of description in the subsequent embodiments.

Figure 3:
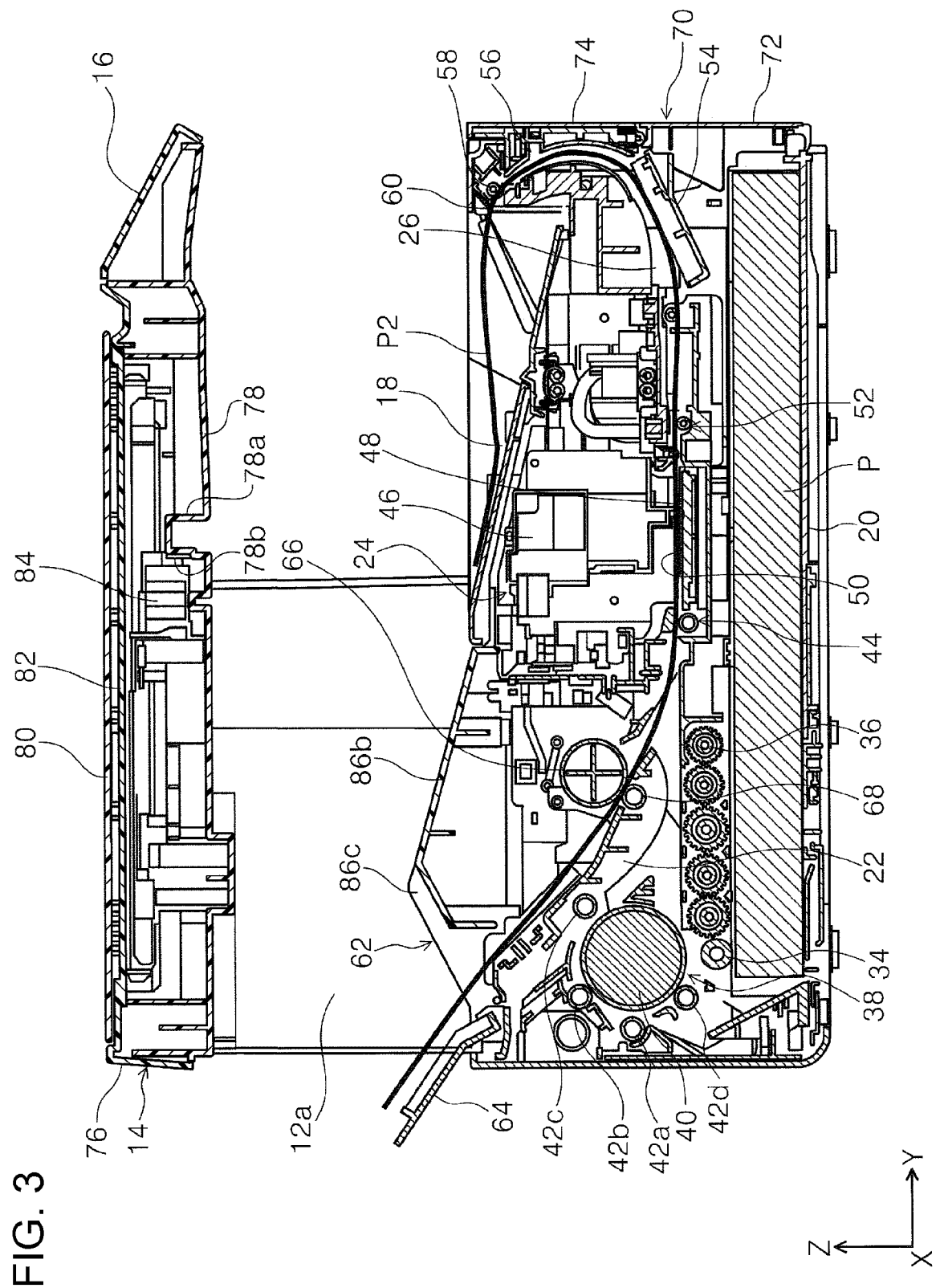
FIG. 3 is a side cross-sectional view illustrating a medium transport path of the printer according to the present embodiment.
Figure 4:
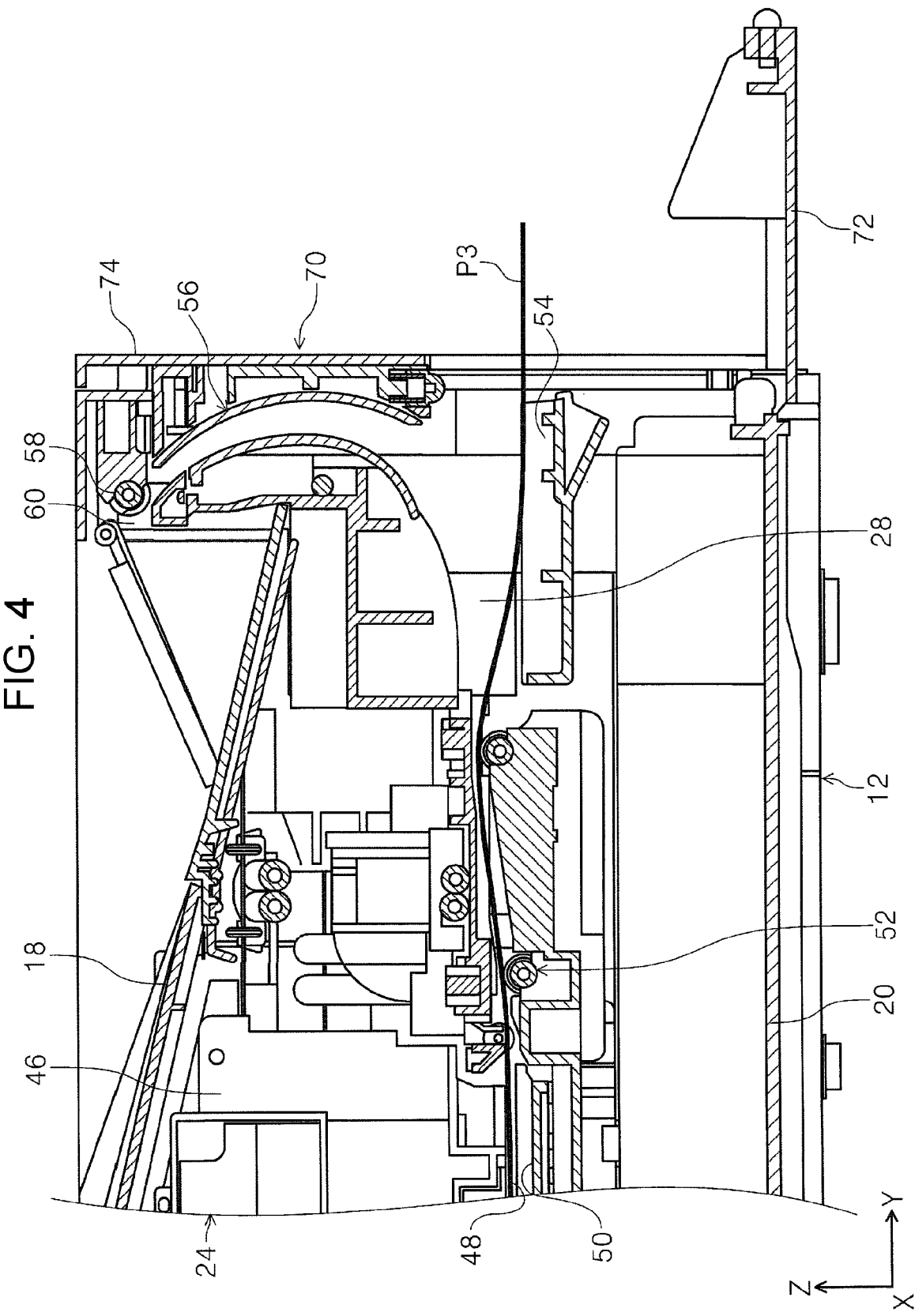
FIG. 4 is a side cross-sectional view illustrating a medium transport path of the printer according to the present embodiment.

FIG. 1 is an outer appearance perspective view of a printer according to the present embodiment, FIG. 2 is a side cross-sectional view illustrating a medium transport path of the printer according to the present embodiment, FIG. 3 is a side cross-sectional view illustrating a medium transport path of the printer according to the present embodiment, and FIG. 4 is a side cross-sectional view illustrating a medium transport path of the printer according to the present embodiment.

Figure 5:
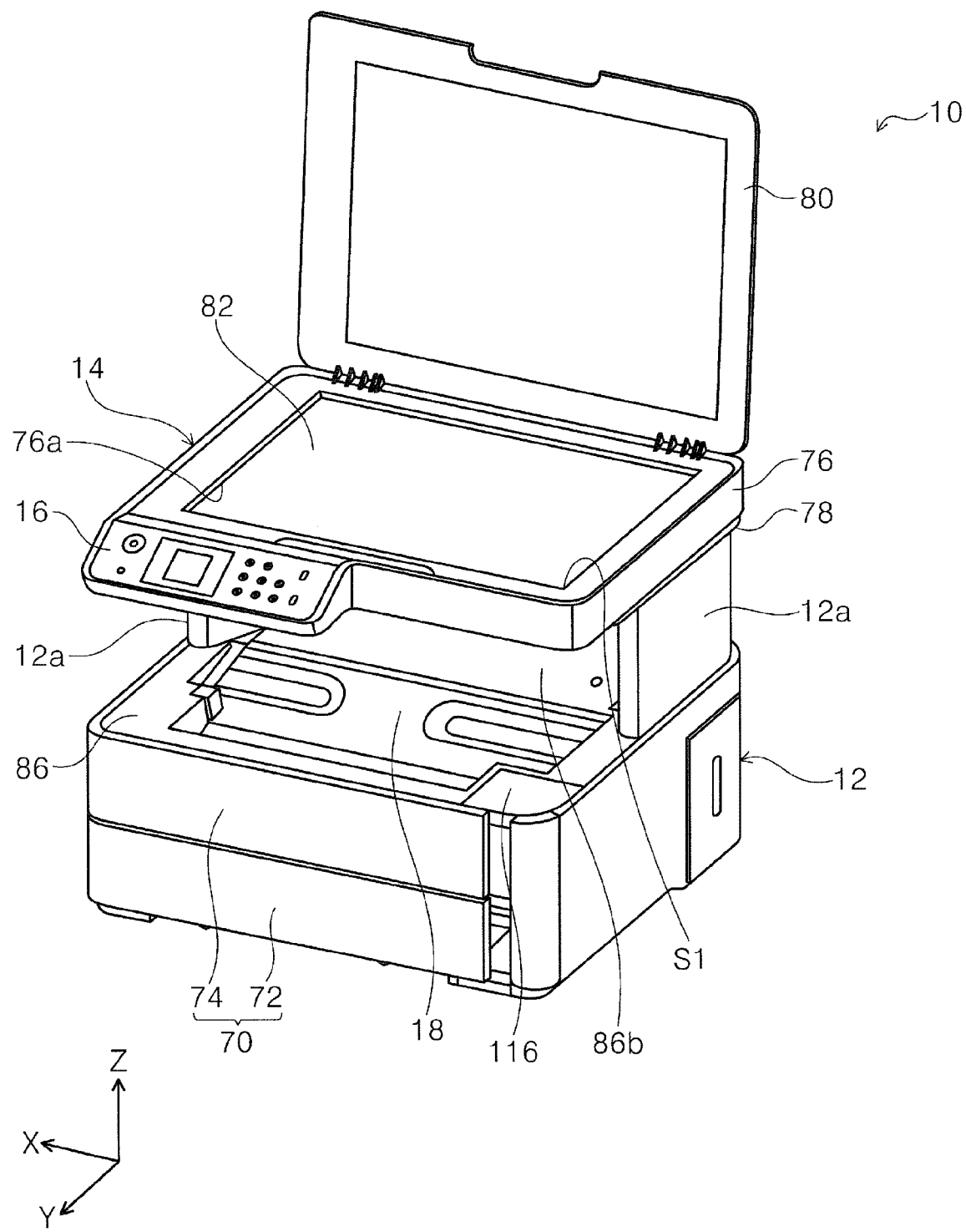
FIG. 5 is a perspective view illustrating that a cover of an upper unit of the printer according to the present embodiment is open.
Figure 6:
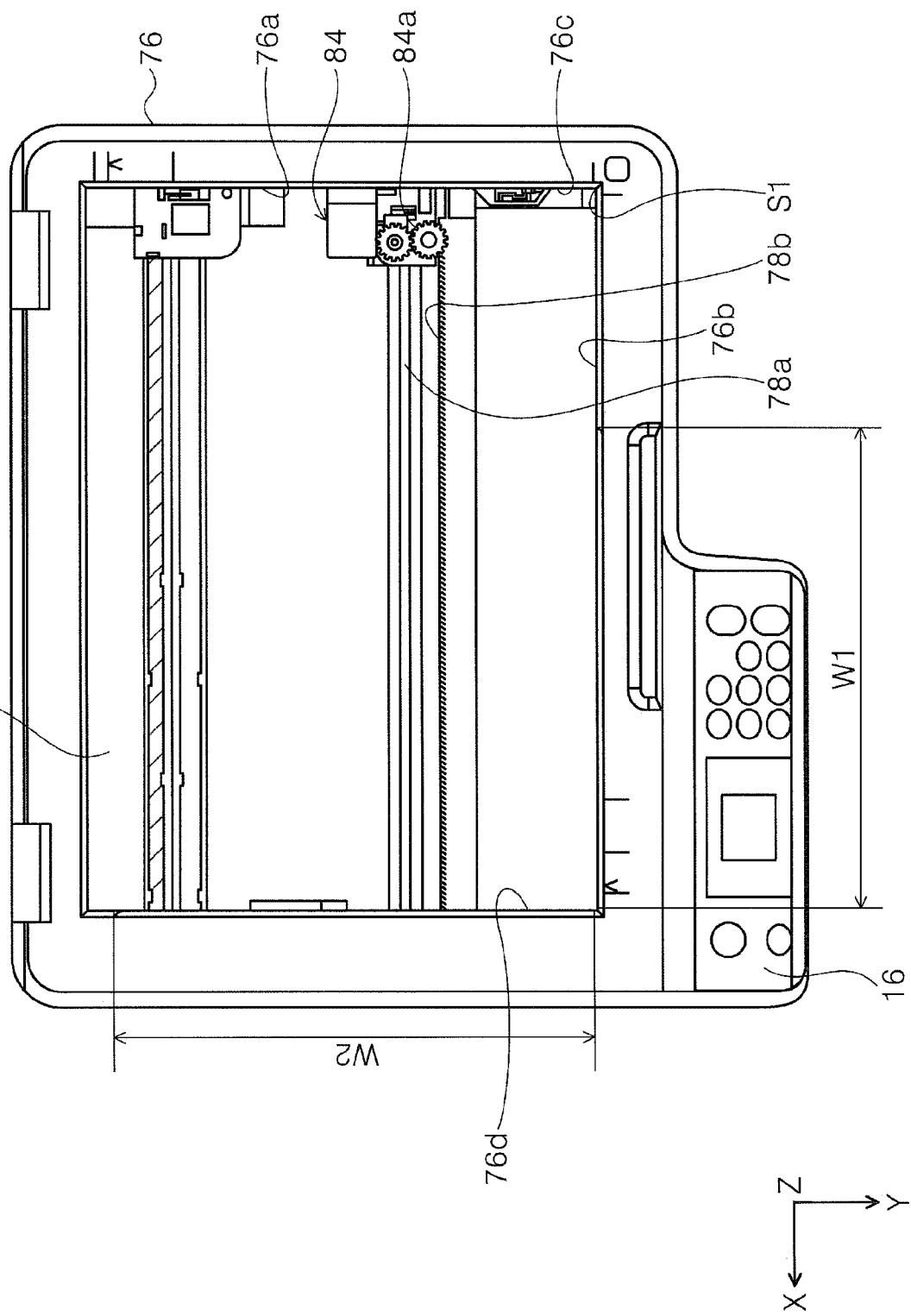
FIG. 6 is a plan view illustrating a document tray and an upper housing in the upper unit.
Figure 7:
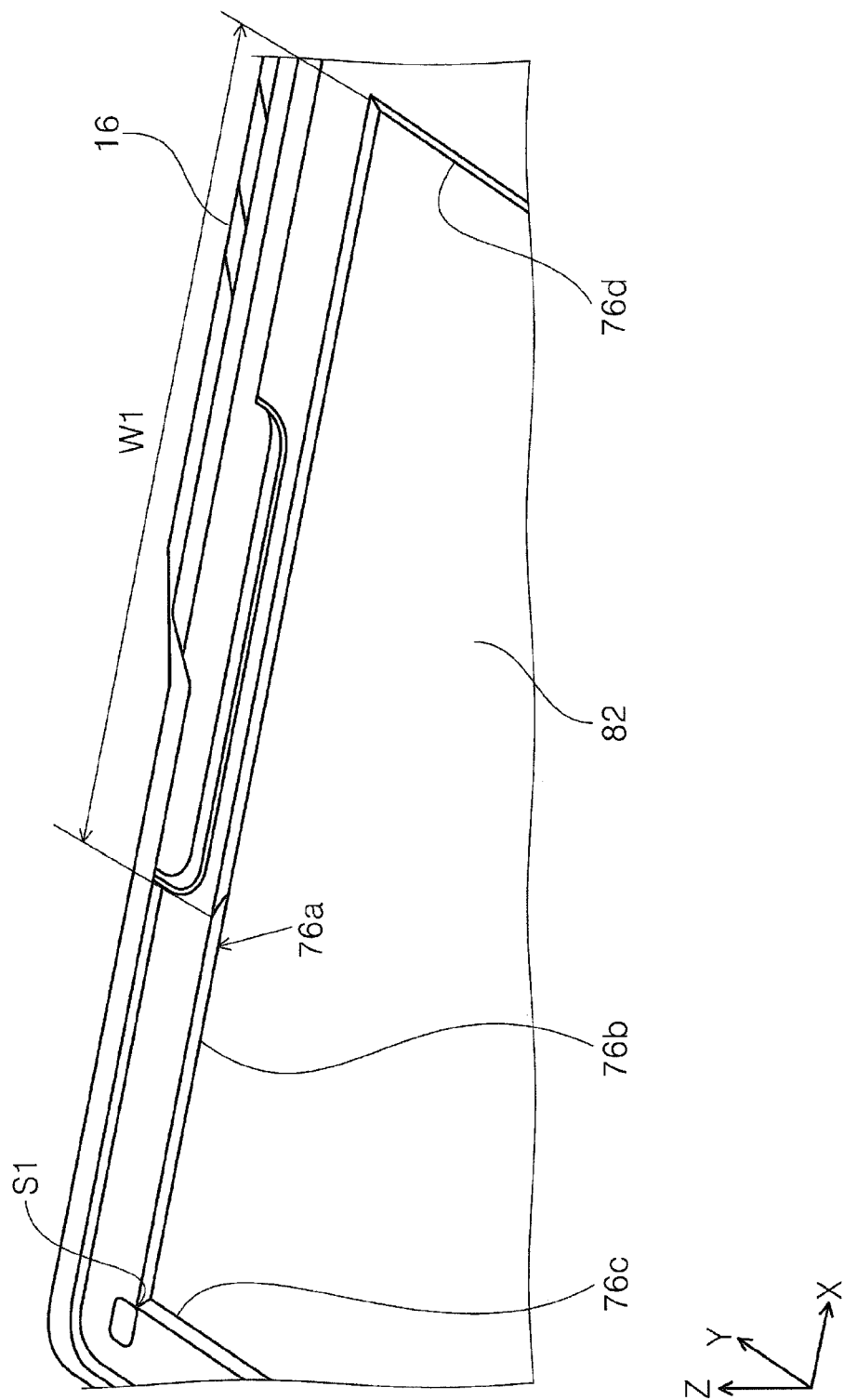
FIG. 7 is a perspective view illustrating the document tray and a document tray frame in the upper housing.
Figure 8:
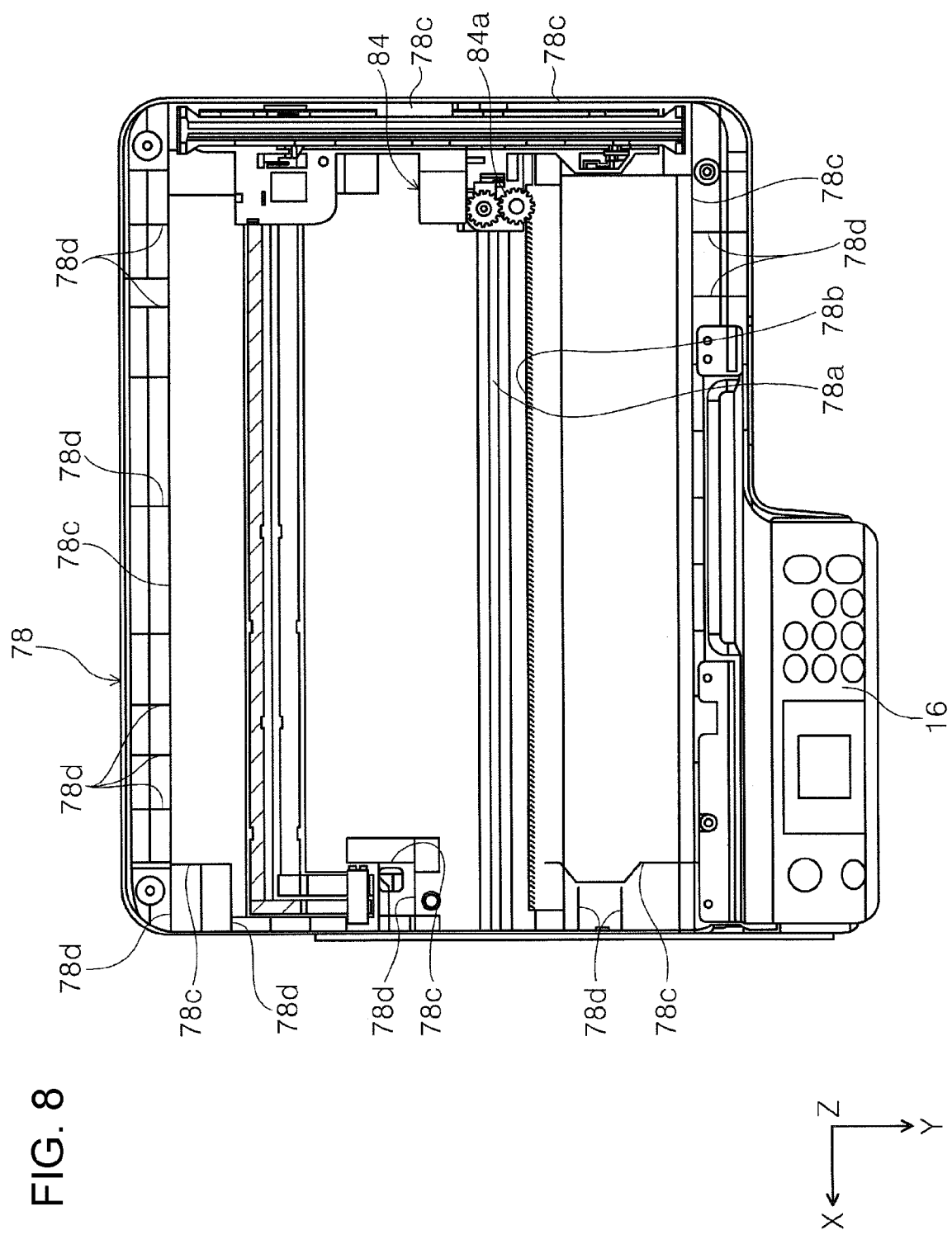
FIG. 8 is a plan view illustrating a lower housing and a reading means in the upper unit.

FIG. 5 is a perspective view illustrating that a cover of an upper unit of the printer according to the present embodiment is open, FIG. 6 is a plan view illustrating a document tray and an upper housing in the upper unit, FIG. 7 is a perspective view illustrating the document tray and a document tray frame in the upper housing, and FIG. 8 is a plan view illustrating a lower housing and a reading means in the upper unit.

Figure 9:
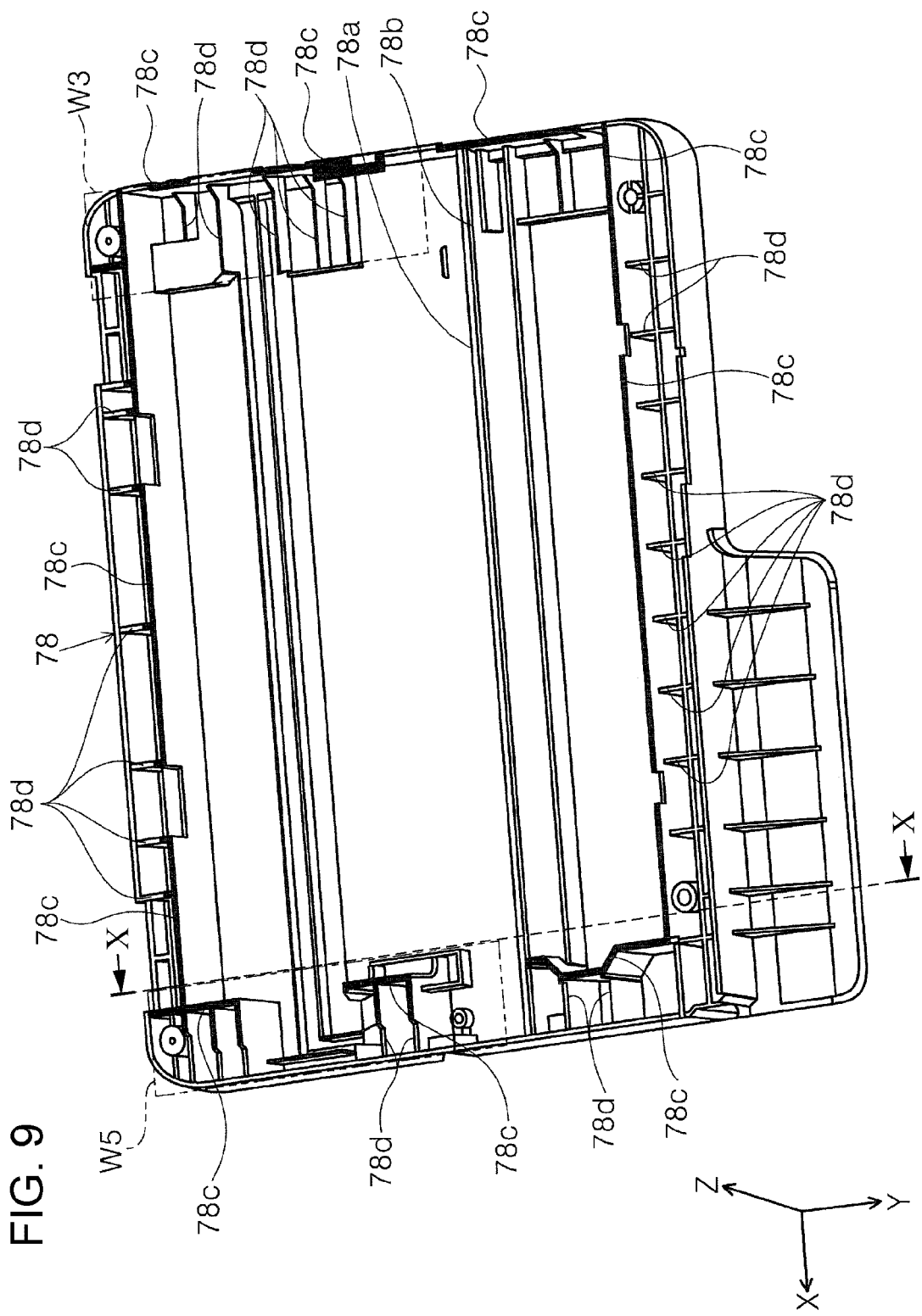
FIG. 9 is a perspective view of the lower housing.
Figure 10:
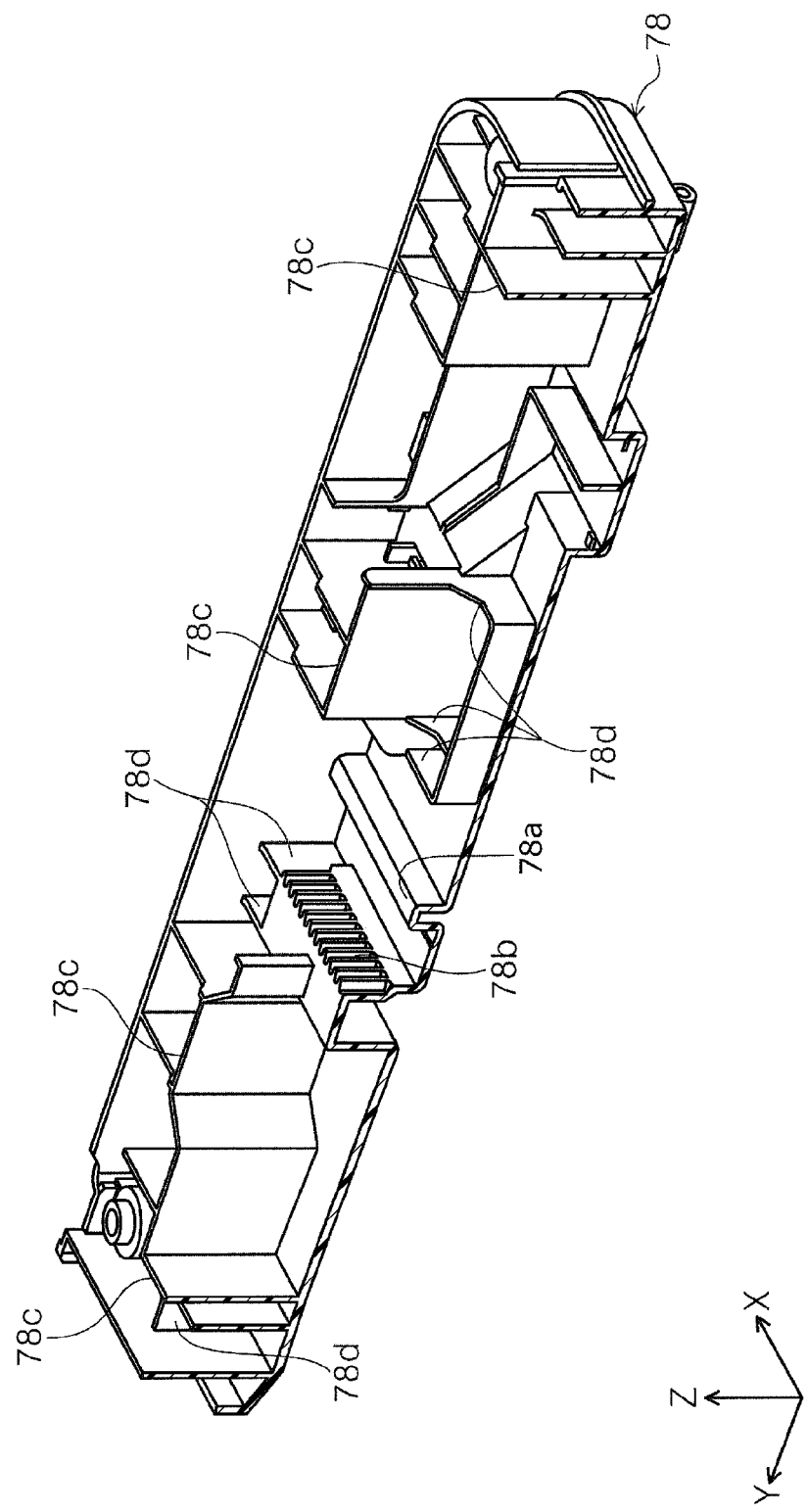
FIG. 10 is a perspective cross-sectional view taken along the line X-X in FIG. 9.
Figure 11:
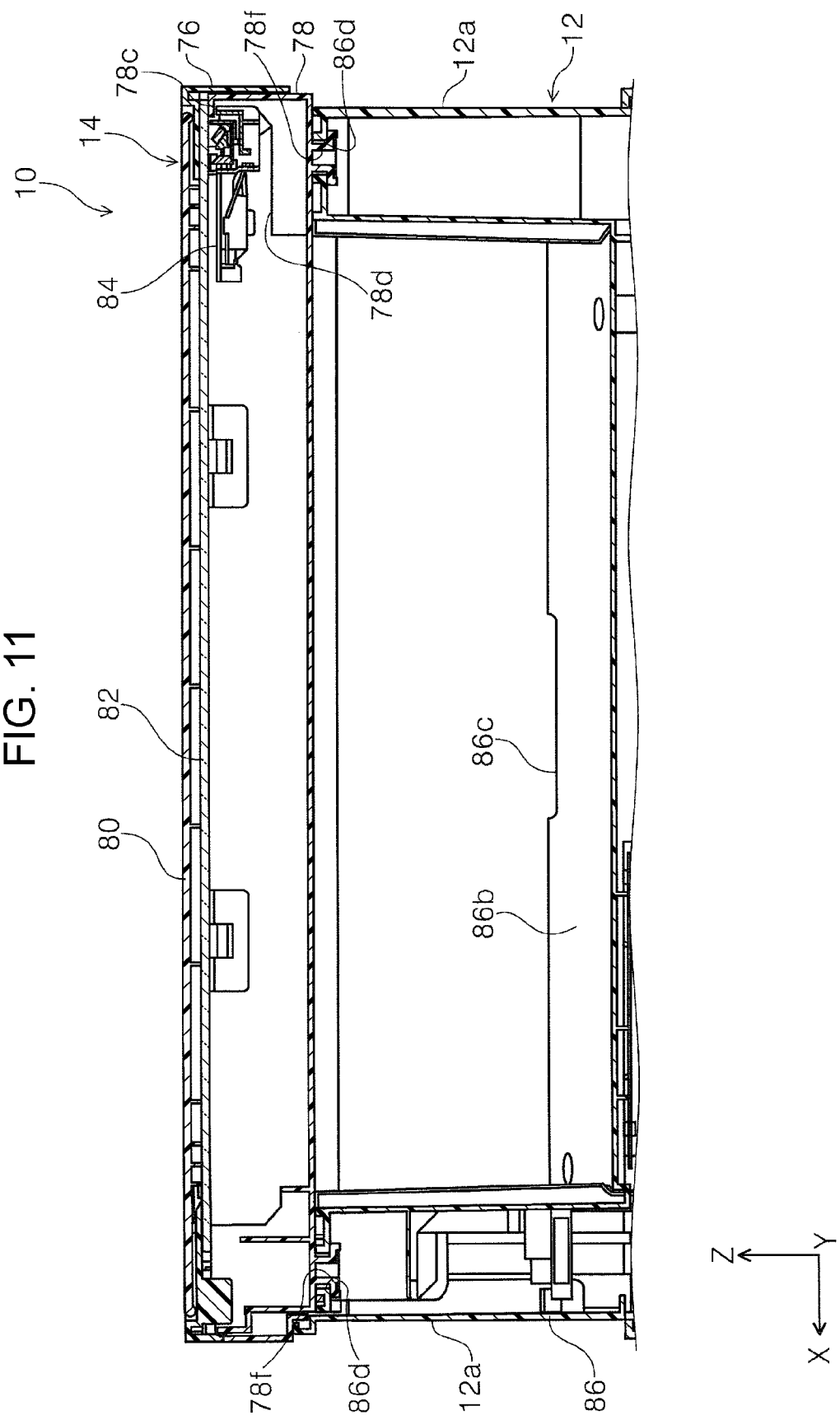
FIG. 11 is a cross-sectional view illustrating the relationship between the upper unit and the lower unit.
Figure 12:
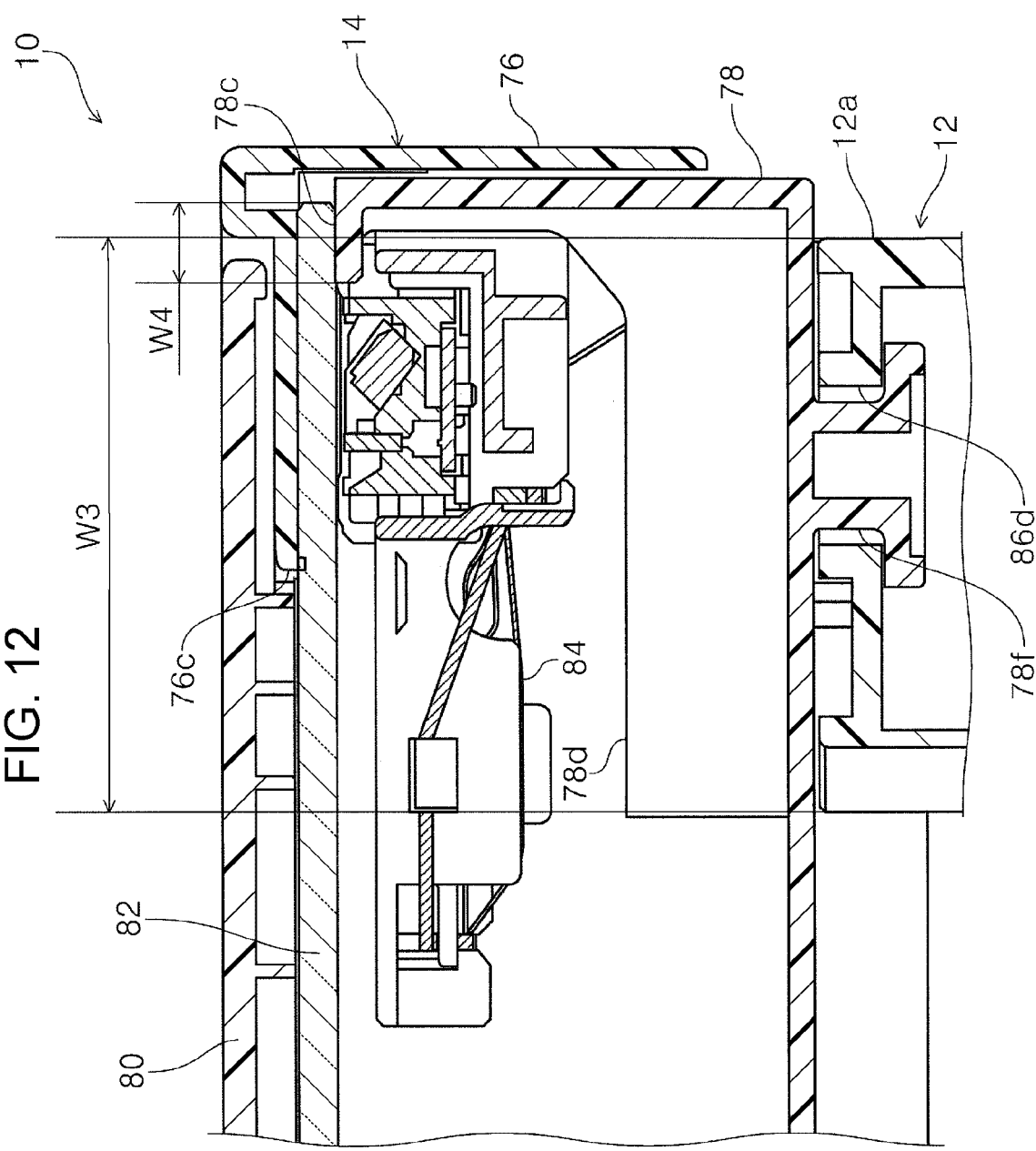
FIG. 12 is a cross-sectional view illustrating the relationship between an end of the upper unit on the −X direction side and a support section of the lower unit.
Figure 13:
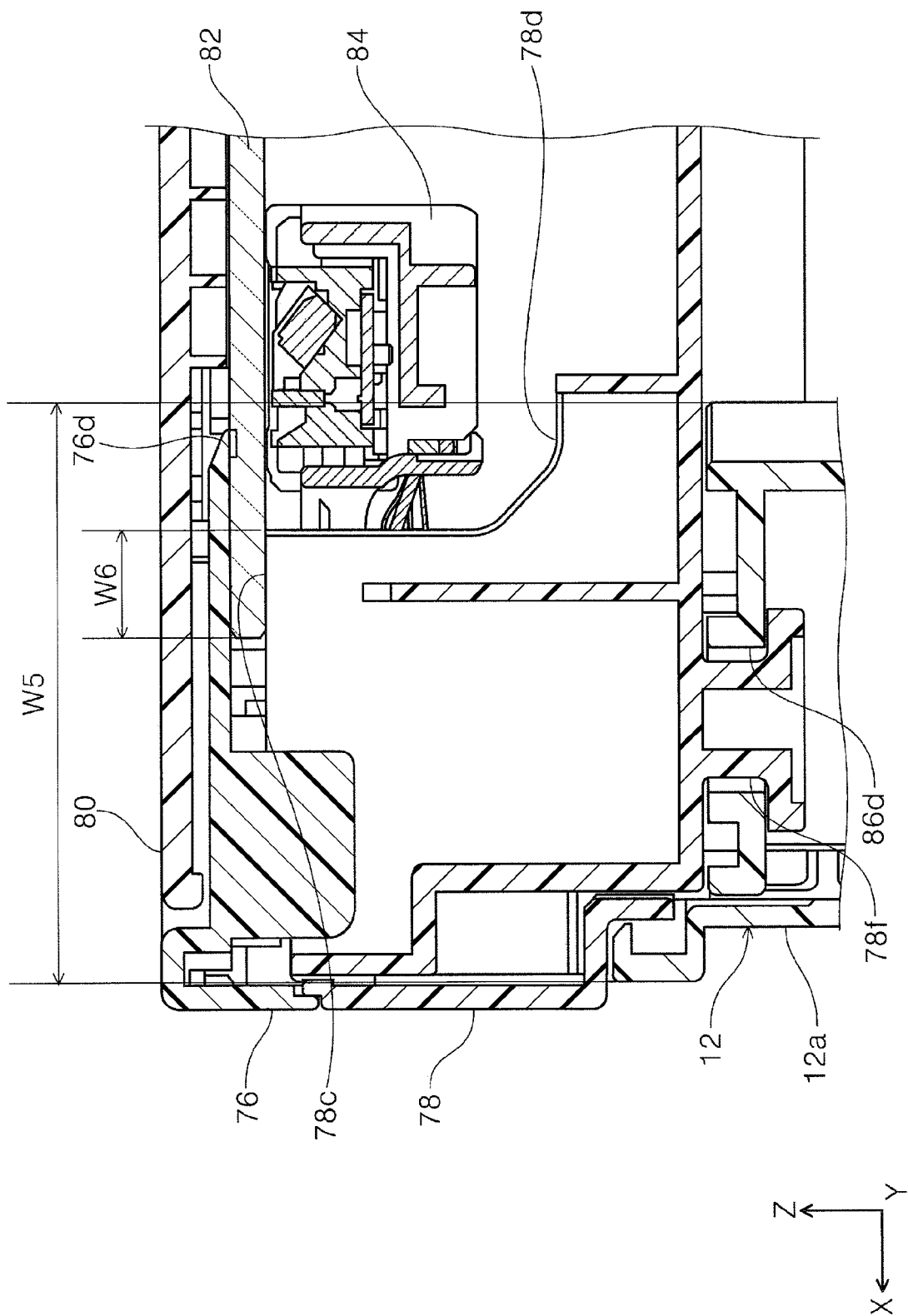
FIG. 13 is a cross-sectional view illustrating the relationship between an end of the upper unit on the +X direction side and a support section of the lower unit.

FIG. 9 is a perspective view of the lower housing, FIG. 10 is a perspective cross-sectional view taken along the line X-X in FIG. 9, FIG. 11 is a cross-sectional view illustrating the relationship between the upper unit and the lower unit, FIG. 12 is a cross-sectional view illustrating the relationship between an end of the upper unit on the −X direction side and a support section of the lower unit, and FIG. 13 is a cross-sectional view illustrating the relationship between an end of the upper unit on the +X direction side and a support section of the lower unit.

Figure 14:
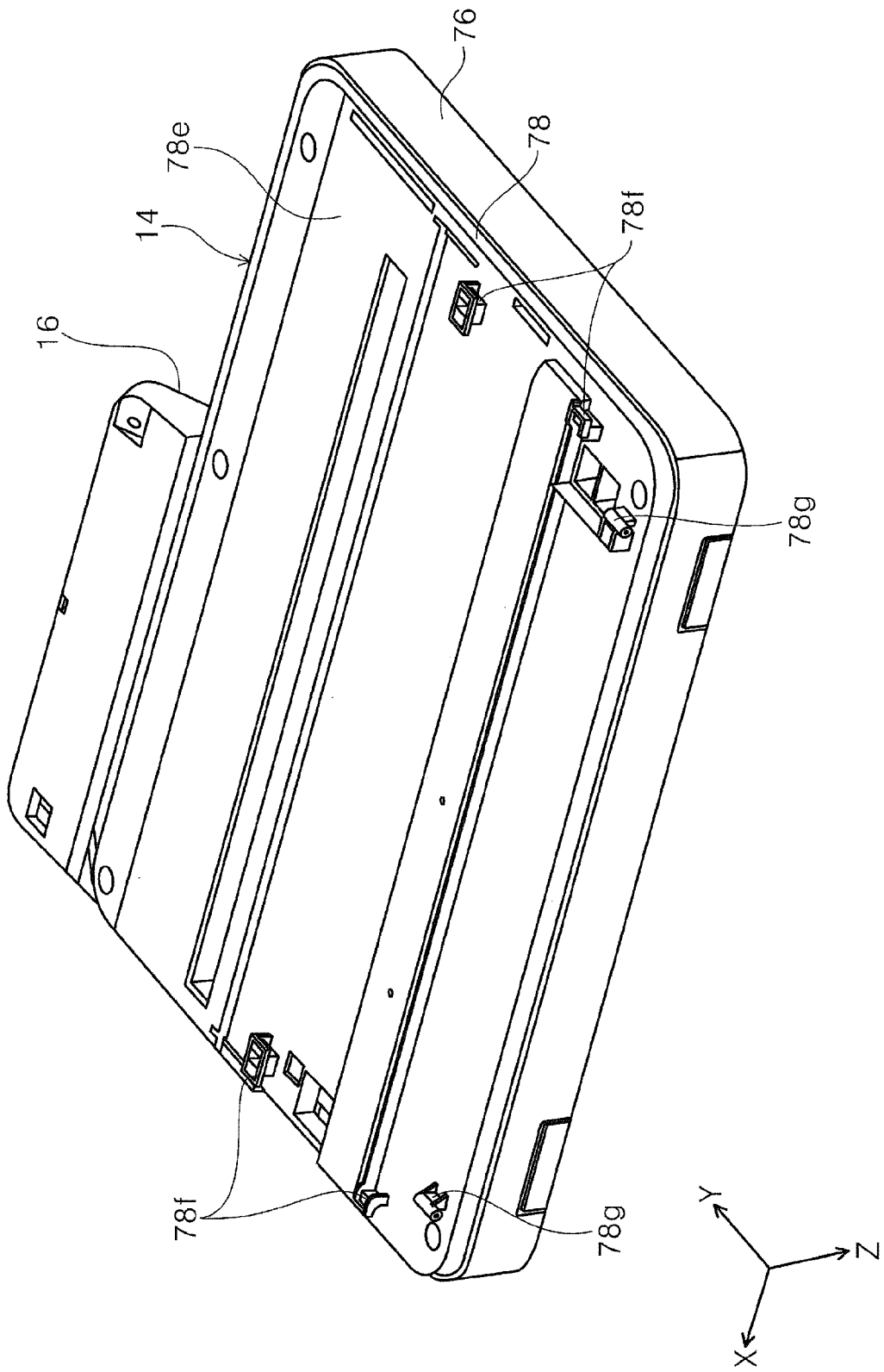
FIG. 14 is a perspective view illustrating an underside of the upper unit.
Figure 15:
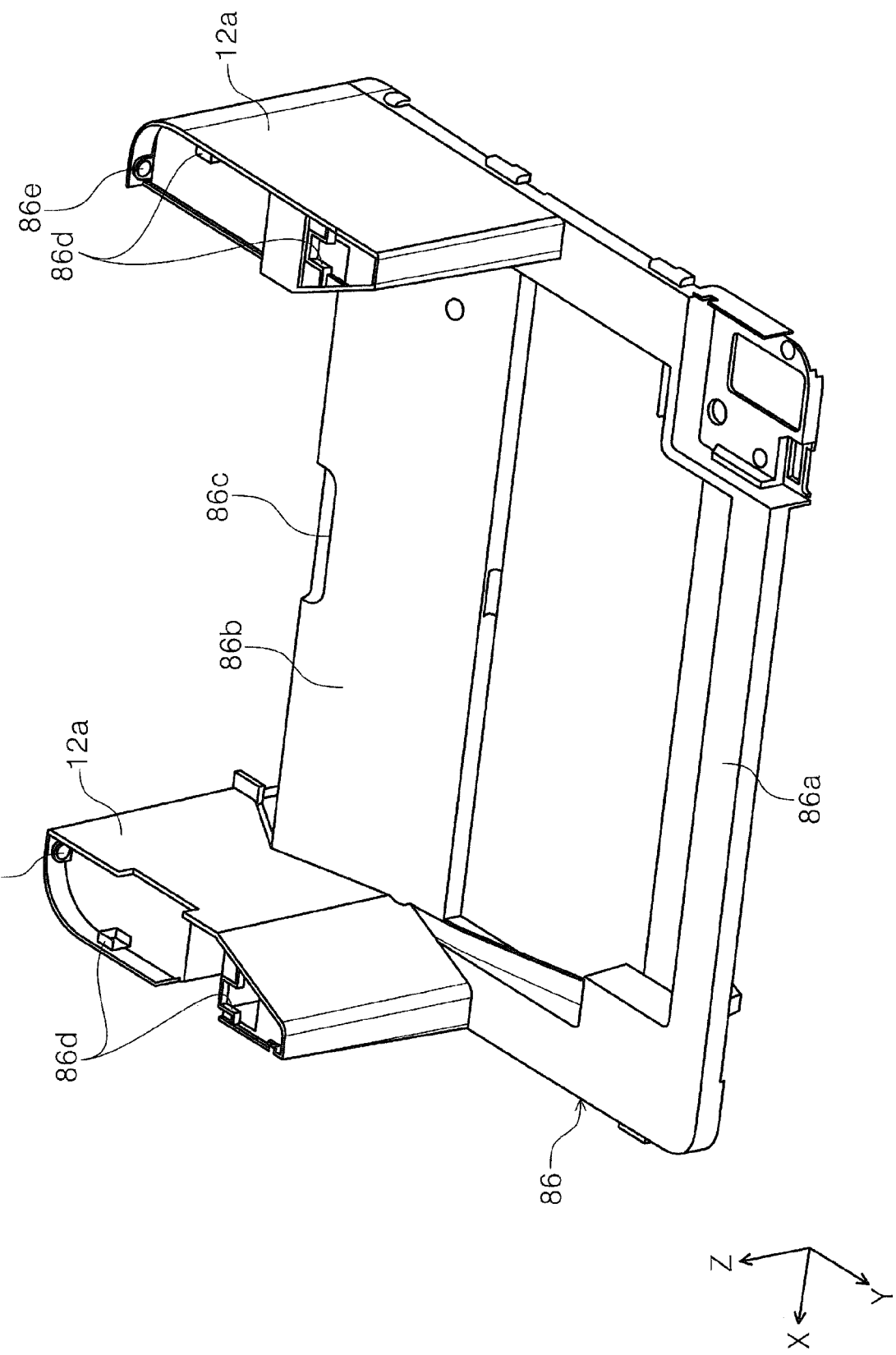
FIG. 15 is a perspective view illustrating an upper member of the lower unit.
Figure 16:
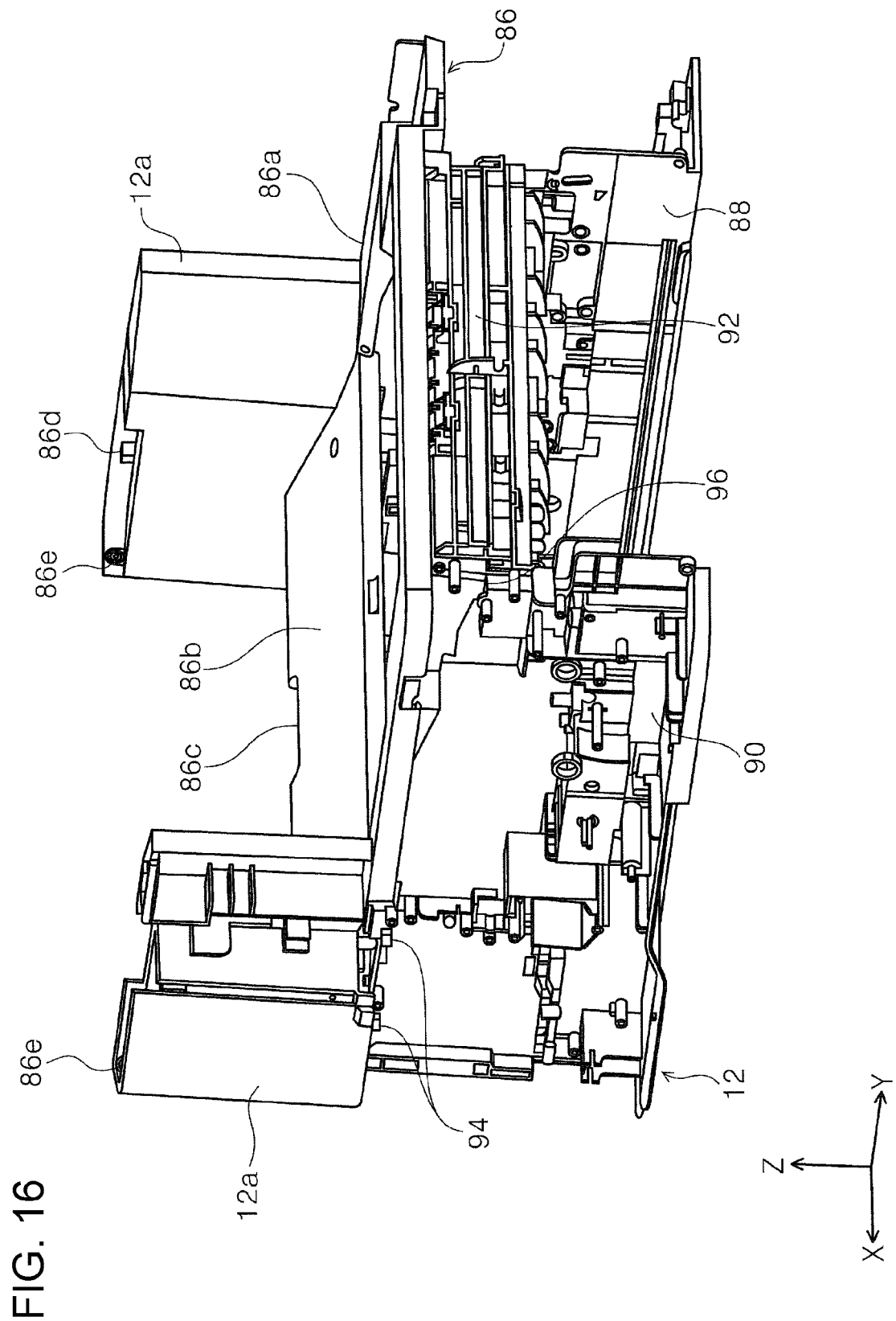
FIG. 16 is a perspective view illustrating connection between the upper member and a left frame in the lower unit.
Figure 17:
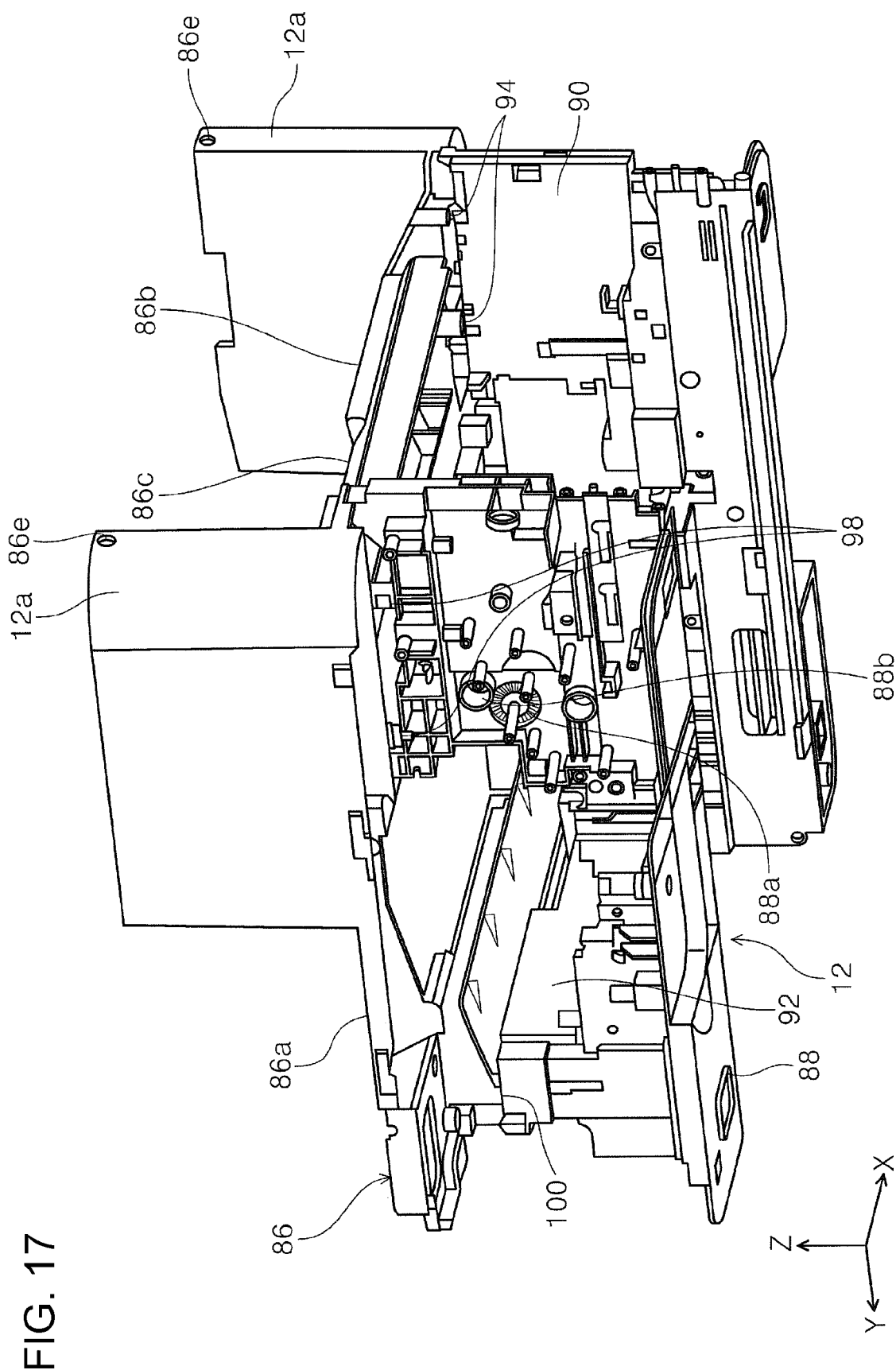
FIG. 17 is a perspective view illustrating connection between the upper member and a right frame in the lower unit.

FIG. 14 is a perspective view illustrating an underside of the upper unit, FIG. 15 is a perspective view illustrating an upper member of the lower unit, FIG. 16 is a perspective view illustrating connection between the upper member and a left frame in the lower unit, and FIG. 17 is a perspective view illustrating connection between the upper member and a right frame in the lower unit.

Figure 18:
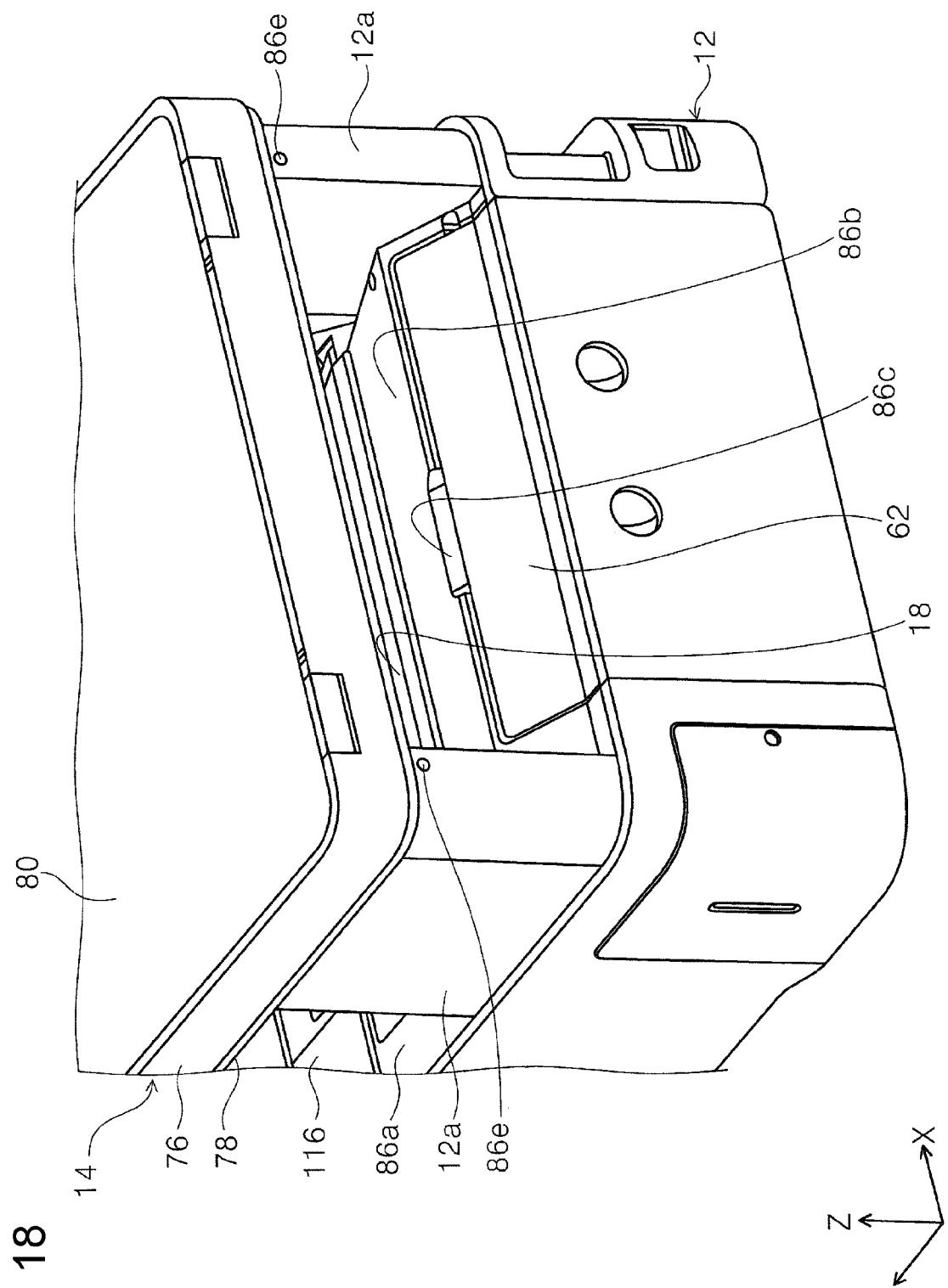
FIG. 18 is a perspective view illustrating a back surface of the printer according to the present embodiment.
Figure 19:
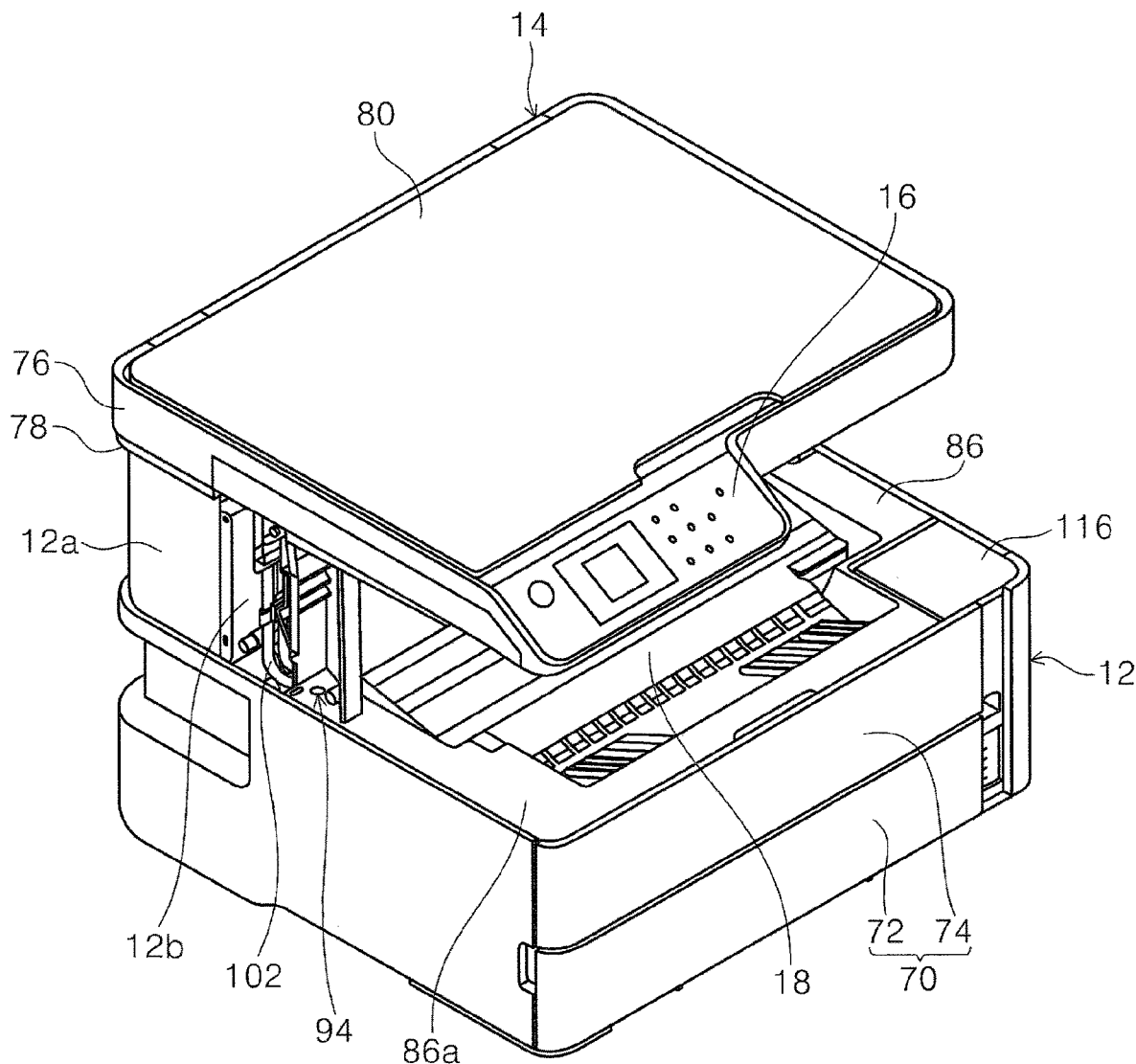
FIG. 19 is a perspective view illustrating a configuration of the support section according to the present embodiment.
Figure 20:
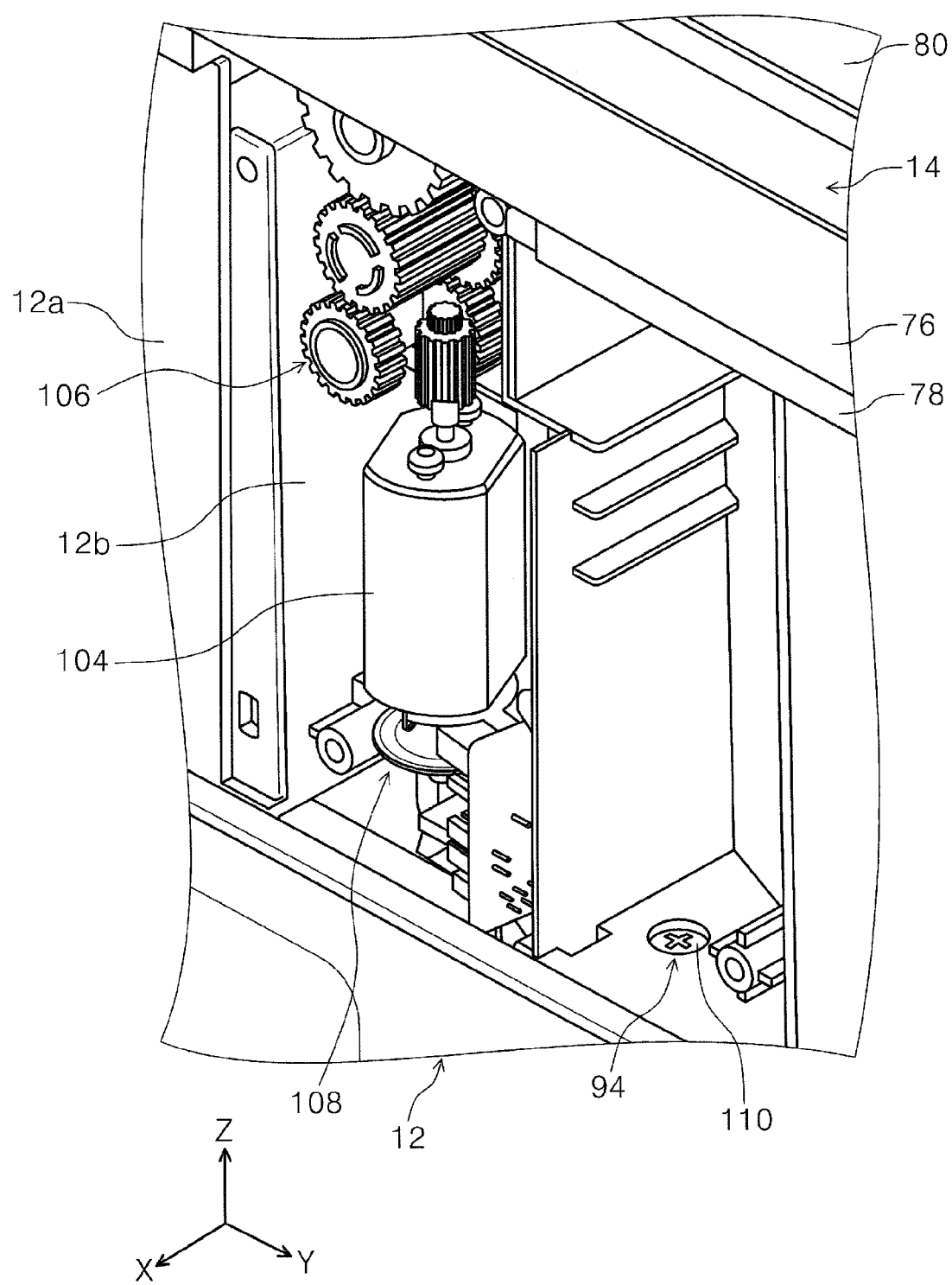
FIG. 20 is a perspective view illustrating a configuration of the support section according to another embodiment.

FIG. 18 is a perspective view illustrating a back surface of the printer according to the present embodiment, FIG. 19 is a perspective view illustrating a configuration of the support section according to the present embodiment, FIG. 20 is a perspective view illustrating a configuration of the support section according to another embodiment, and FIG. 21 is a perspective view illustrating a configuration of the support section according to another embodiment.

Figure 22:
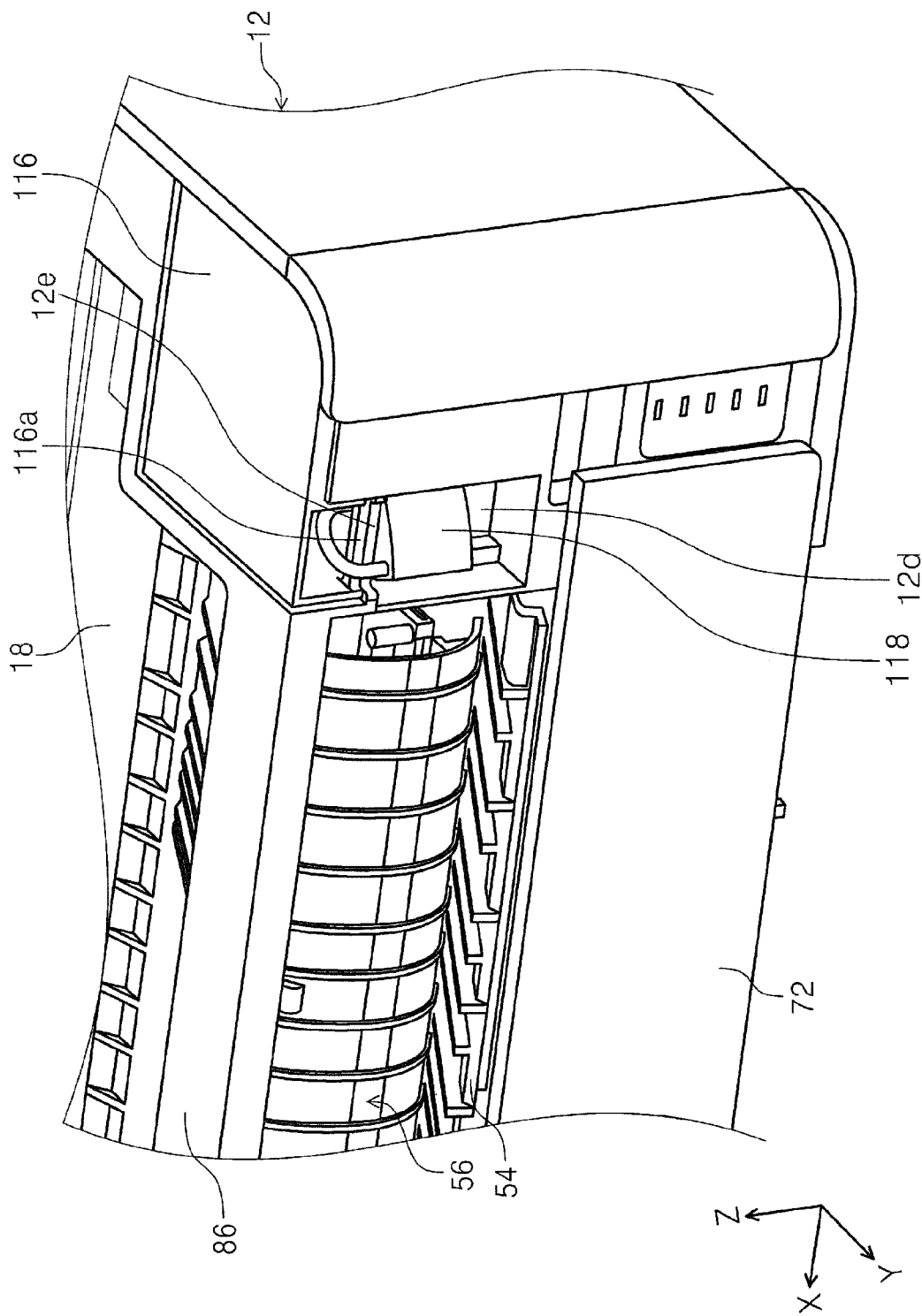
FIG. 22 is a perspective view illustrating that opening and closing of a cover of an ink housing section in the lower unit is regulated by a lock.
Figure 23:
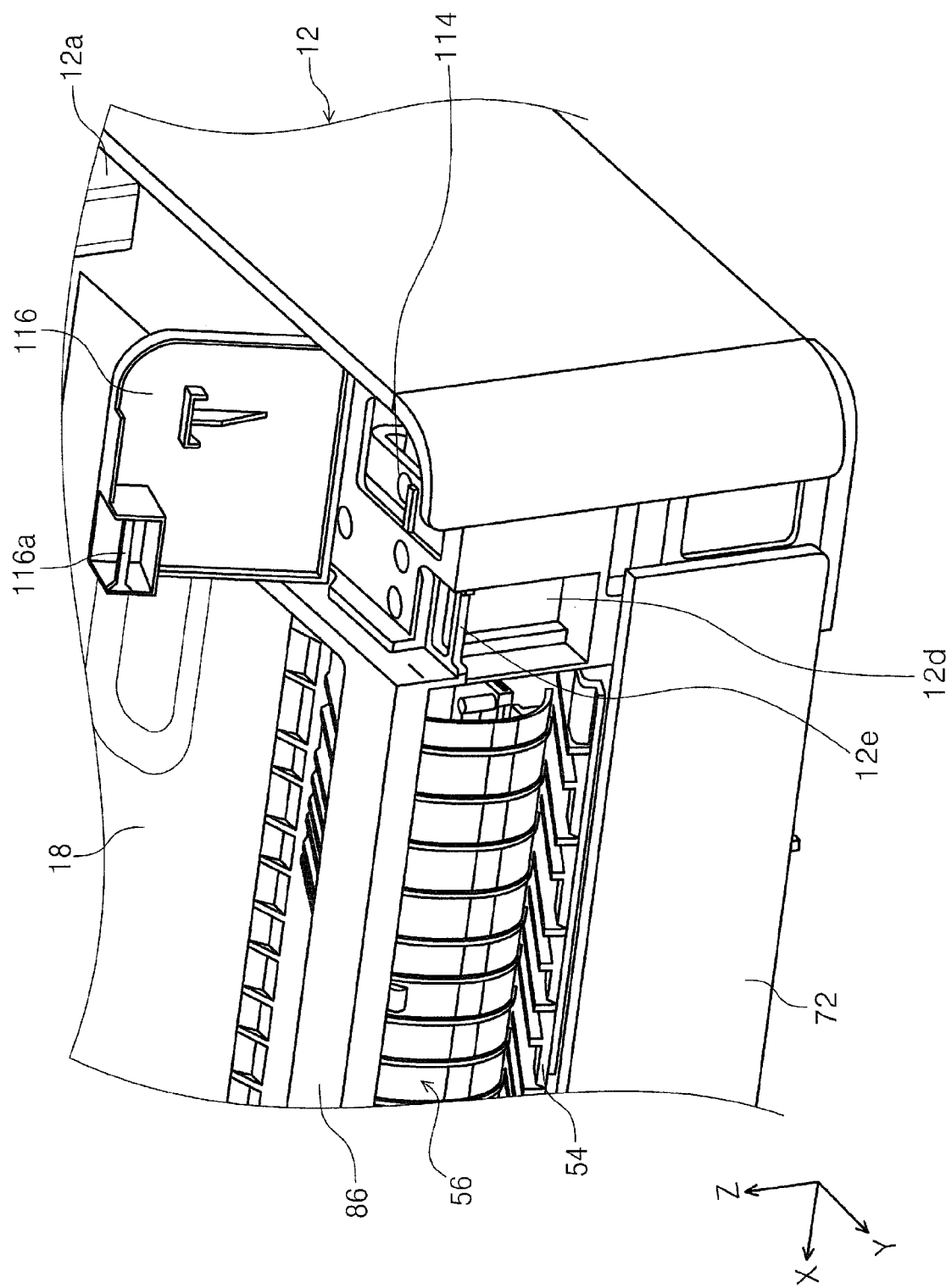
FIG. 23 is a perspective view illustrating that the cover of the ink housing section in the lower unit is open is in an open state.
Figure 24:
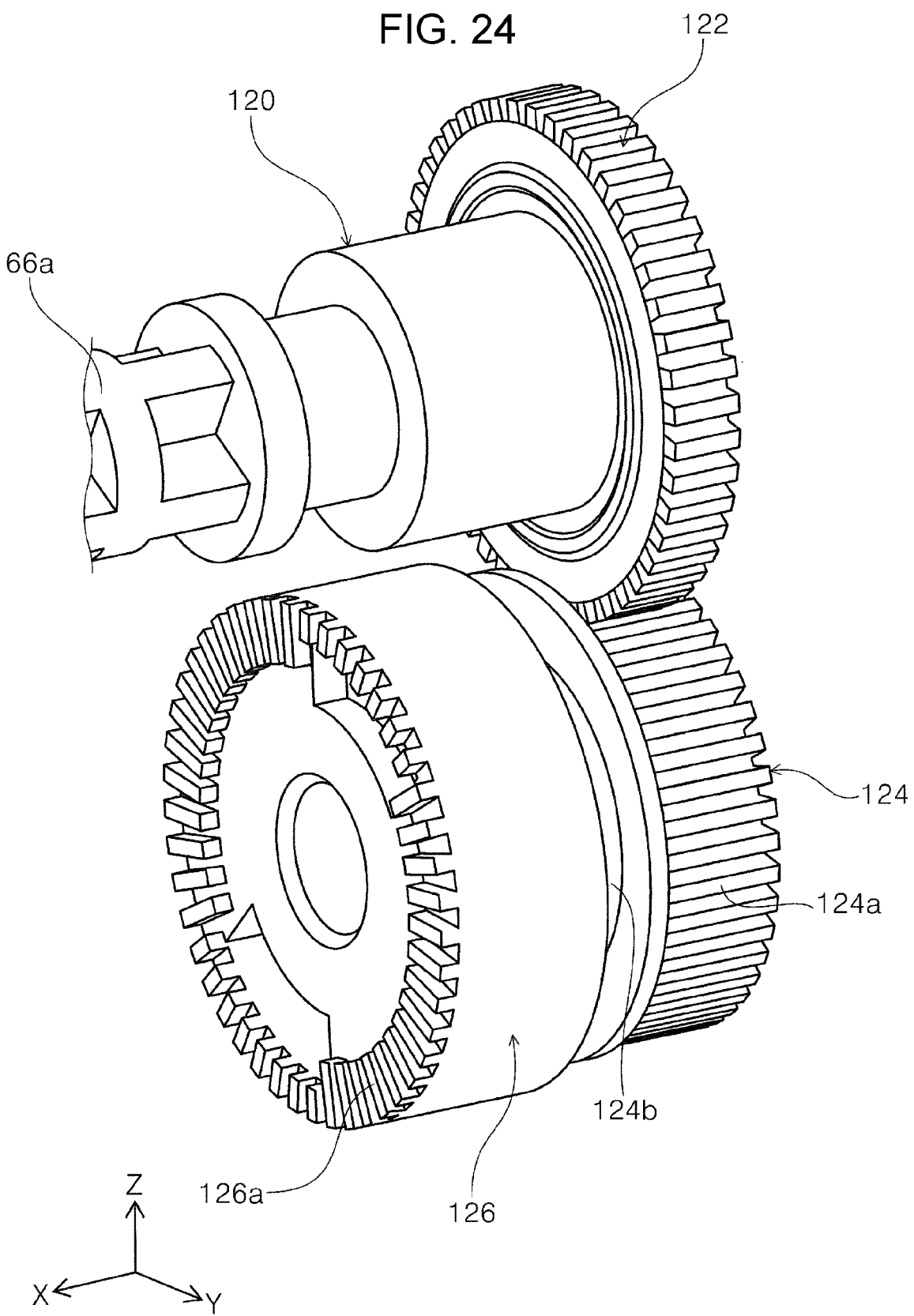
FIG. 24 is a perspective view illustrating a clutch mechanism of a sheet feeding roller.
Figure 25:
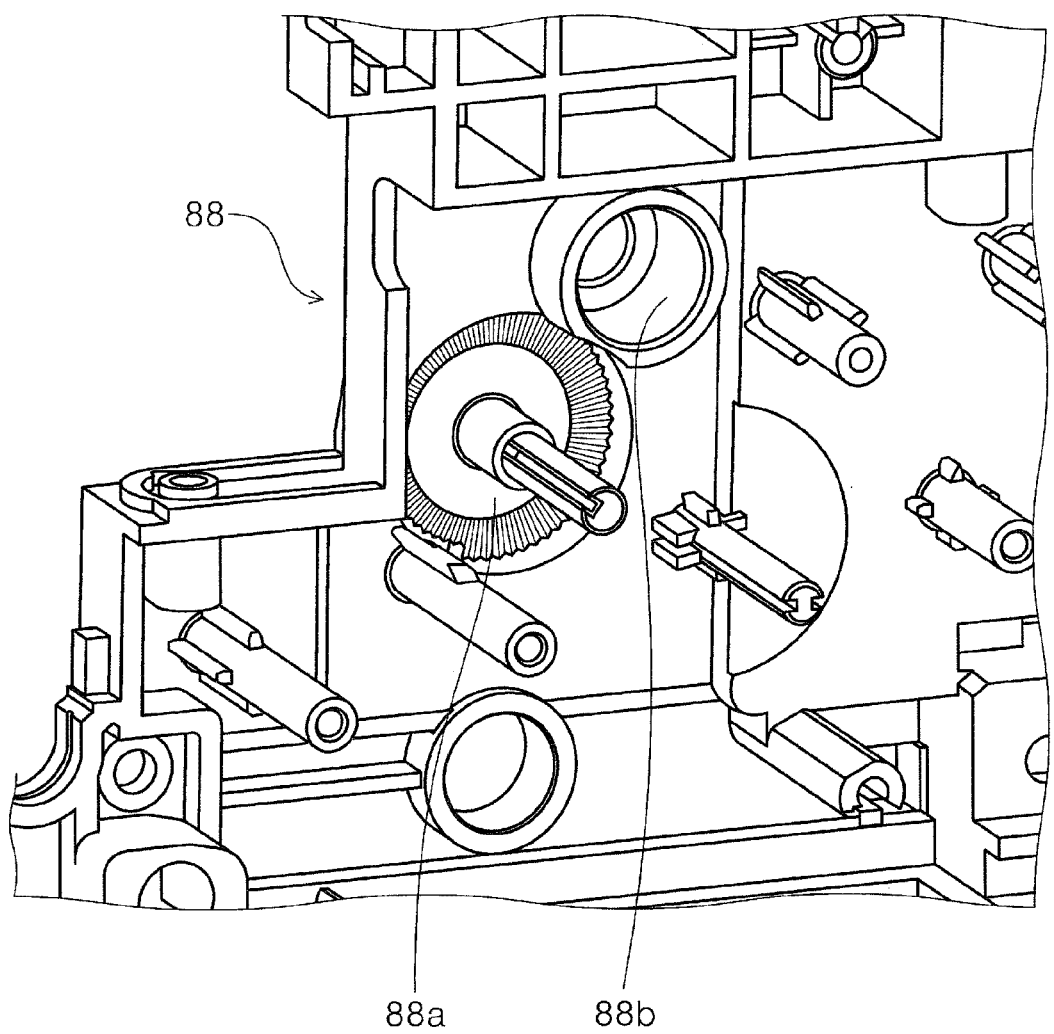
FIG. 25 is a perspective view of a frame member engaging with the clutch mechanism.

FIG. 22 is a perspective view illustrating that opening and closing of a cover of an ink housing section in the lower unit is regulated by a lock, FIG. 23 is a perspective view illustrating that the cover of the ink housing section in the lower unit is open is in an open state, FIG. 24 is a perspective view illustrating a clutch mechanism of a sheet feeding roller, and FIG. 25 is a perspective view of a frame member engaging with the clutch mechanism.

Figure 26:
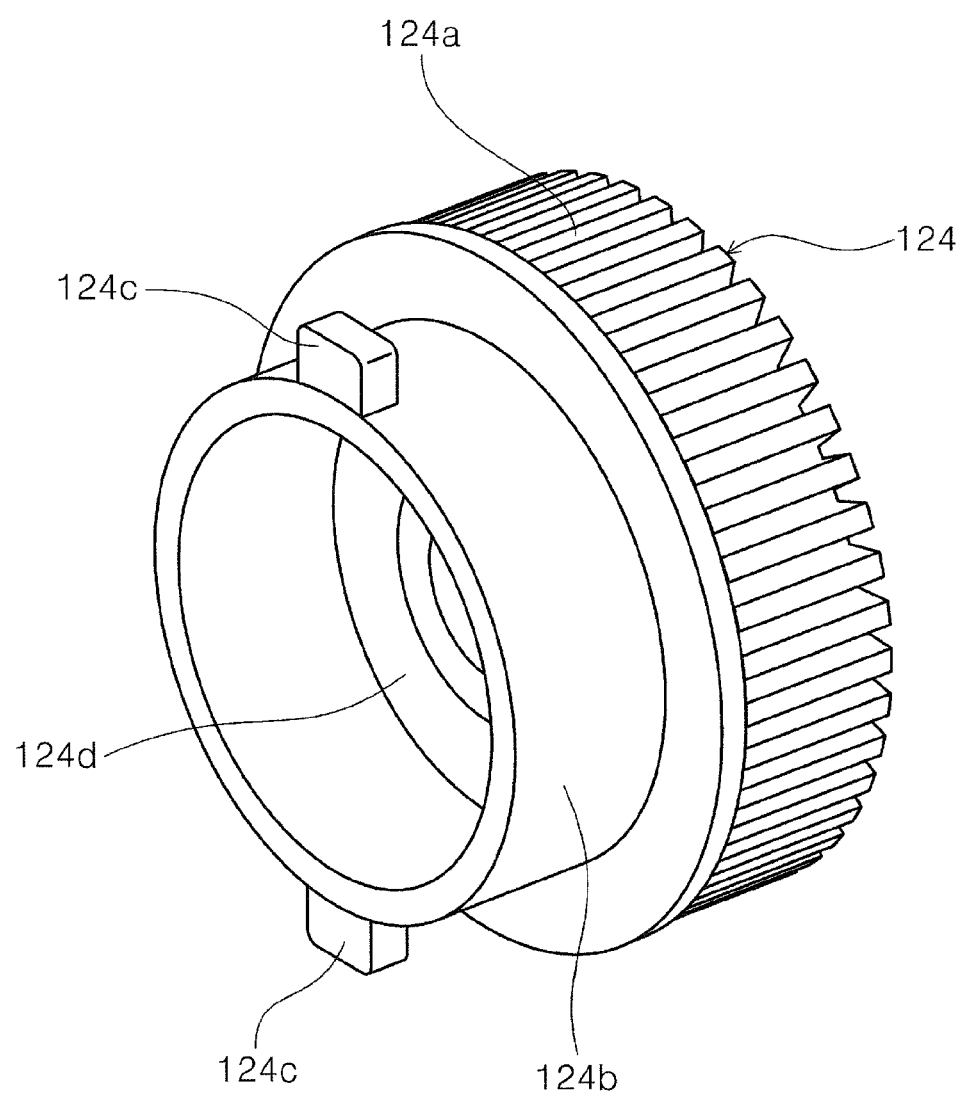
FIG. 26 is a perspective view illustrating a clutch switching gear.
Figure 27:
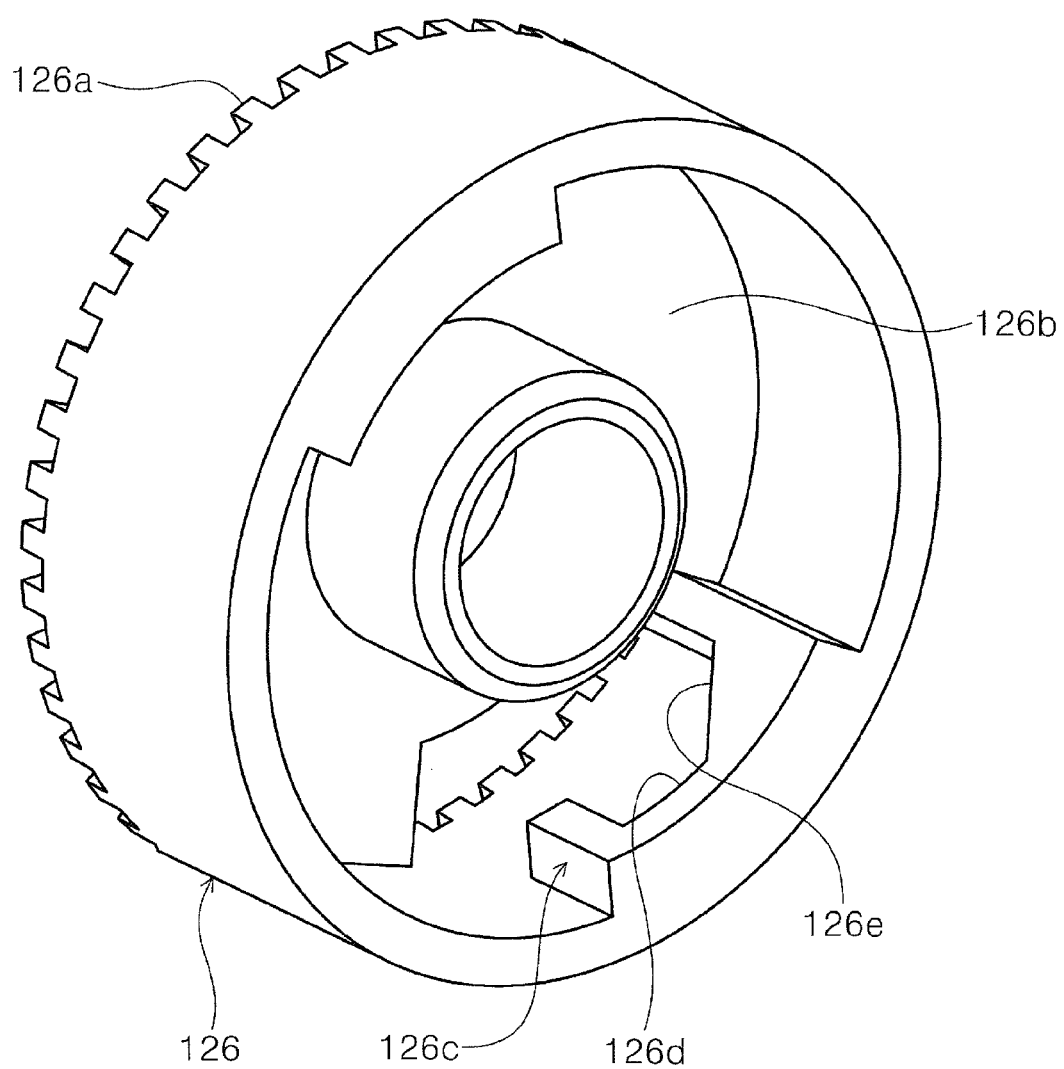
FIG. 27 is a perspective view illustrating a clutch member.
Figure 28:
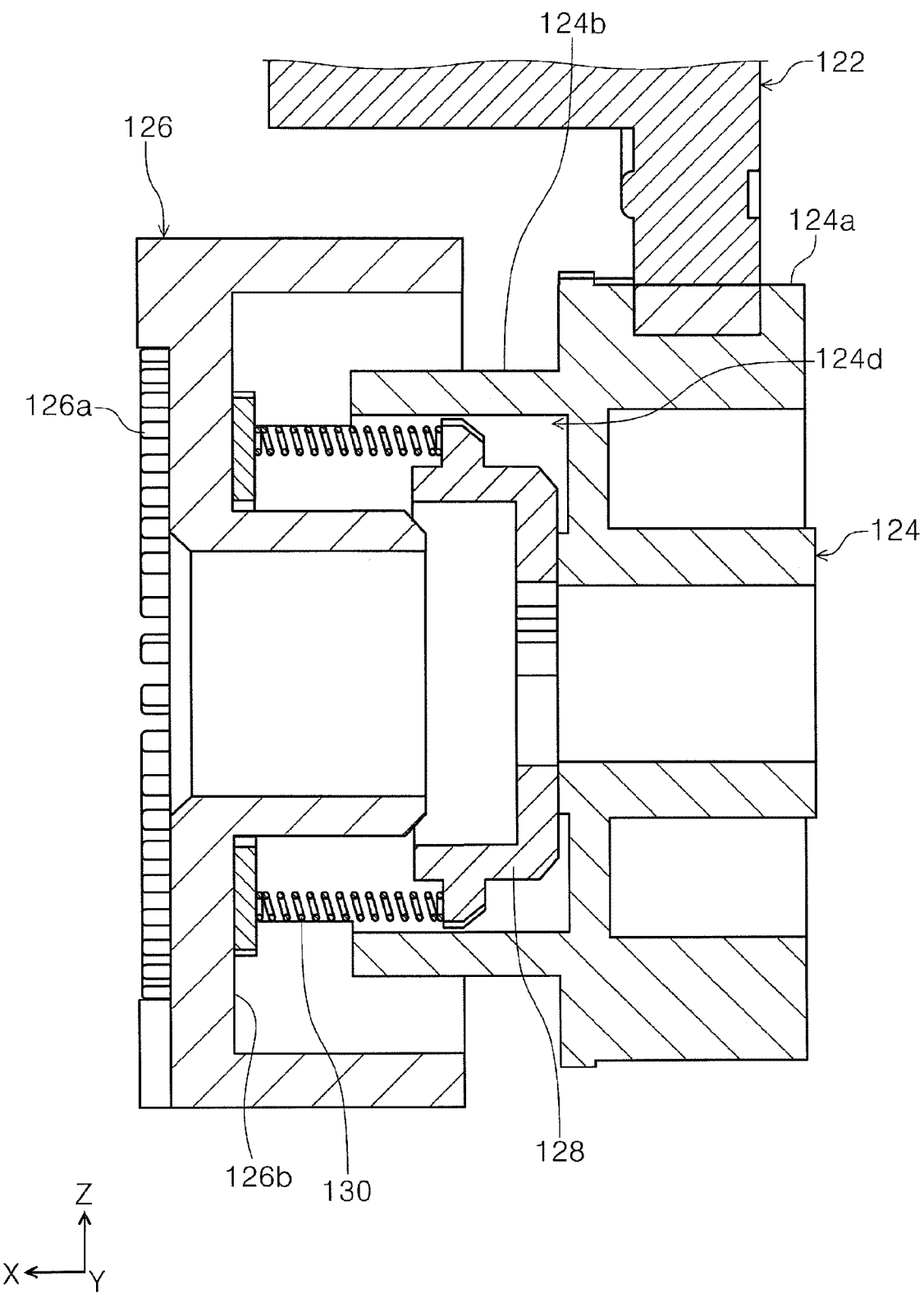
FIG. 28 is a side cross-sectional view of the clutch mechanism.
Figure 29:
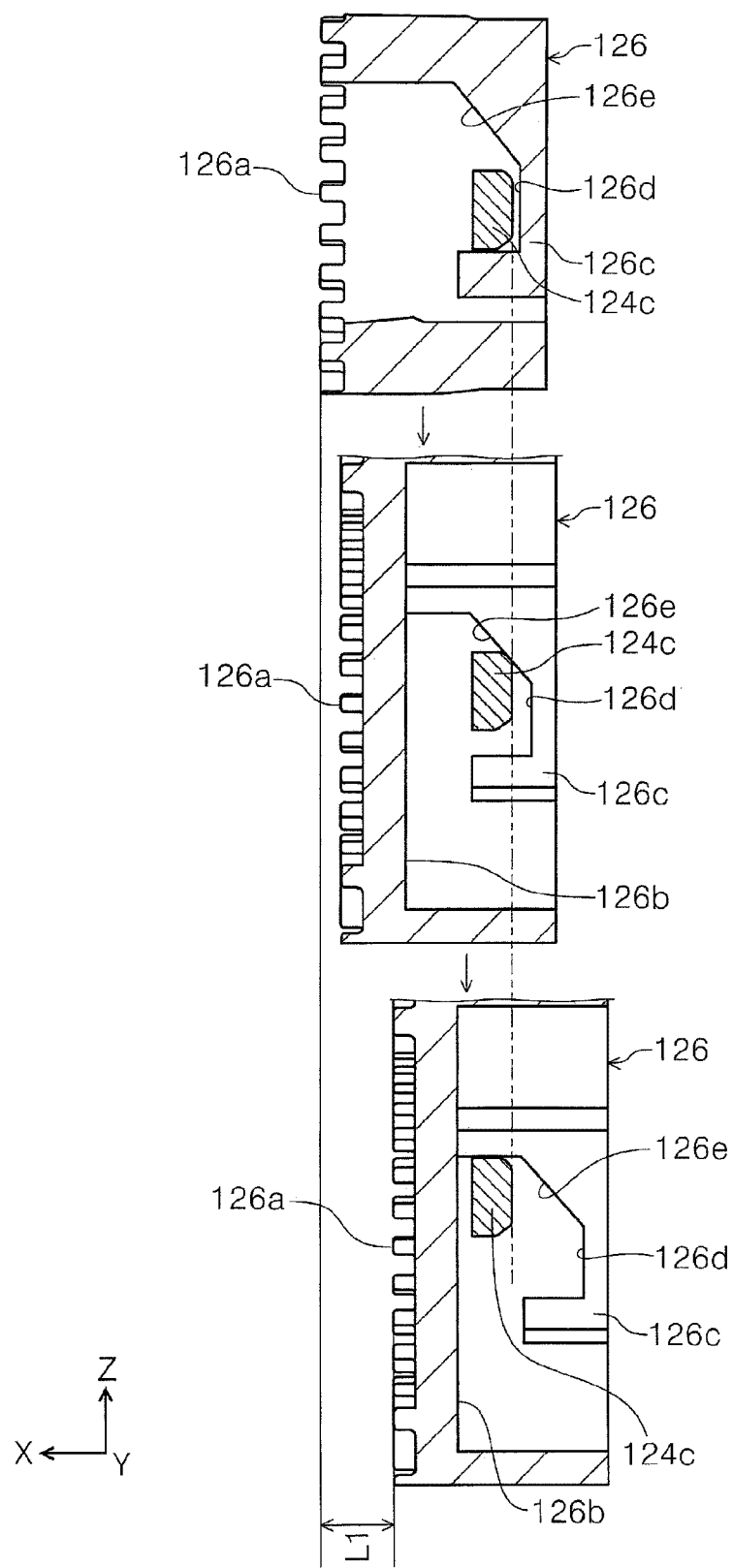
FIG. 29 is a side cross-sectional view illustrating transition of a clutch switching state in the clutch mechanism.

FIG. 26 is a perspective view illustrating a clutch switching gear, FIG. 27 is a perspective view illustrating a clutch member, FIG. 28 is a side cross-sectional view of the clutch mechanism, and FIG. 29 is a side cross-sectional view illustrating transition of a clutch switching state in the clutch mechanism.

Further, in the X-Y-Z coordinate system in the drawings, the X direction represents a width direction of a recording medium, that is, an apparatus width direction, the Y direction represents a transport direction of a recording medium in a transport path in a recording apparatus, that is, an apparatus depth direction, and the Z direction represents an apparatus height direction.

Overview of Printer

With reference to FIG. 1, an overall configuration of a printer 10 will be described. The printer 10 is configured as an ink jet printer, which is an example of a recording apparatus. The printer 10 is configured as a multifunction machine which includes a lower unit 12 as a recording apparatus and an upper unit 14 as a scanner. Support sections 12a extending in the +Z direction are formed on both ends in the X axis direction of the lower unit 12. The upper unit 14 is disposed above the lower unit 12, and is supported by the support sections 12a.

An operation section 16 is disposed on an end of the upper unit 14 in the +Y direction. The operation section 16 includes a plurality of operation buttons and a display panel. The operation section 16 in the present embodiment is configured to operate a recording operation in the printer 10 and an image reading operation in the upper unit 14 (scanner).

A medium receiving tray 18 is disposed above the lower unit 12. In the present embodiment, the medium receiving tray 18 is configured to receive a medium in a tilted position outputted from the lower unit 12 (FIGS. 2 and 3). Specifically, the medium receiving tray 18 is configured as an inclined surface upwardly inclined (+Z axis direction) in the −Y axis direction, which is an output direction of a medium P.

Medium Transport Path

With reference to FIG. 2, a medium transport path 22 extending from a medium housing section 20 to the medium receiving tray 18 will be described. In the present embodiment, the medium transport path 22 includes a curved reversing path 26 which reverses while being curved in the +Z direction on a downstream side in the transport direction relative to the recording section 24, and a straight path 28 (FIG. 4) which extends toward apparatus front surface on the downstream side in the transport direction relative to the recording section 24. Further, the bold line indicated by reference number P1 in FIG. 2 represents a path for the medium P that is transported along the medium transport path 22.

In FIG. 2, the medium housing section 20 is disposed on an end of the lower unit 12 in the −Z direction. The medium housing section 20 in the present embodiment is configured such that, for example, a long side direction of the maximum size of the medium P housed in the medium housing section 20 is an apparatus depth direction (medium transport direction, Y axis direction), and a short side direction of the maximum size of the medium P is an apparatus width direction (X axis direction). Alternatively, a short side direction of the maximum size of the medium P housed in the medium housing section 20 may be an apparatus depth direction (medium transport direction, Y axis direction), and a long side direction of the maximum size of the medium P may be an apparatus width direction (X axis direction).

A pick-up roller 34 is disposed on the +Z direction side of the medium housing section 20. The pick-up roller 34 is rotatable about a rotation shaft 36. The pick-up roller 34 comes into contact with the medium P housed in the medium housing section 20 to thereby transport the uppermost medium P of the media housed in the medium housing section 20 to the downstream side in the transport direction along the medium transport path 22.

In the medium transport path 22, a medium reversing section 38 is disposed on the downstream side relative to the pick-up roller 34. The medium reversing section 38 is provided at and around a reversing roller 40, and includes driven rollers 42a, 42b, 42c, and 42d which are driven and rotated by the reversing roller 40.

The medium P fed by the pick-up roller 34 is fed to a transport roller pair 44 disposed on the downstream in the transport direction via the medium reversing section 38. A recording section 24 is disposed on the downstream side in the transport direction relative to the transport roller pair 44. The recording section 24 includes a carriage unit 46. The carriage unit 46 is movable in the X axis direction, and a recording head 48 is disposed under the carriage unit 46 so as to eject ink into the −Z direction.

A medium support section 50 is disposed on a region facing the recording head 48 under the recording head 48. The medium support section 50 supports an underside of the medium P (surface opposite from the recording surface) which has been transported to the region facing the recording head 48 by the transport roller pair 44. Then, the recording head 48 performs recording onto a recording surface (surface facing the recording head 48) of the medium P by ejecting ink onto the medium P supported by the medium support section 50.

An output roller pair 52 is disposed on the downstream side in the transport direction relative to the recording head 48. A medium receiving tray 54 is disposed on the downstream side in the transport direction relative to the output roller pair 52. The medium receiving tray 54 is switched between a guiding position (FIGS. 2 and 3) which guides the medium P from the recording section 24 to the curved reversing path 26 and a medium receiving position (FIG. 4) which constitutes the straight path 28 (FIG. 4) extending from the recording section 24 toward the apparatus front surface and receives the medium P outputted from the output roller pair 52. Specifically, the positional switching is performed by pivoting the medium receiving tray 54 relative to the lower unit 12.

In FIG. 2, a curved reversing path forming section 56 is disposed on the downstream relative to the medium receiving tray 54 which is in the guiding position, more specifically, on the +Z direction side. The curved reversing path forming section 56 in the present embodiment constitutes the curved reversing path 26 that curves and reverses the medium P.

The medium P which has been fed downstream from the recording section 24 by the output roller pair 52 is guided to the curved reversing path forming section 56 by the medium receiving tray 54, which is in the guiding position. The curved reversing path forming section 56 curves and reverses the medium P with the recording surface facing inward, on which recording has been just performed in the recording section 24. The curved reversing path forming section 56 then outputs the medium P from an output port 60 to the medium receiving tray 18 via an output roller 58 disposed on the downstream side relative to the curved reversing path forming section 56. Here, the medium P is outputted onto the medium receiving tray 18 with a surface (first surface) on which recording has been performed in the recording section 24 downward.

In the present embodiment, the curved reversing path 26 is configured as a face-down path that outputs the medium P in a face-down state (in which the recording surface faces downward) onto the medium receiving tray 18 from the recording section 24 via the medium receiving tray 54 which is in the guiding position and the curved reversing path forming section 56. Further, the curved reversing path 26 in the present embodiment is configured, for example, to start from the −Y direction end of the medium receiving tray 54 in the medium transport direction and end at the output port 60.

Further, in the case where recording is performed by the recording section 24 onto a first surface (upper surface) of the medium P and then onto a second surface (underside), which is opposite from a first surface, the medium P is transported upstream in the transport direction by counter-rotating the transport roller pair 44. The medium P transported upstream in the transport direction is fed back to the medium reversing section 38 and is nipped between the reversing roller 40 and the driven roller 42d. Then, the first surface and the second surface of the medium P are reversed by the reversing roller 40, and the medium P is again transported to the recording section 24, in which recording is performed on the second surface by the recording section 24. After that, the medium P is outputted onto the medium receiving tray 18 via the curved reversing path 26.

Then, with reference to FIG. 3, medium transport from a rear-side feeding section 62 will be described. A rear-side feeding section 62 is disposed on an end of the lower unit 12 in the −Y direction. The rear-side feeding section 62 is provided with a feeding port cover 64. The feeding port cover 64 is pivotable relative to the lower unit 12, and can switch a closed state (FIGS. 2 and 18) and an open state (FIG. 2). As shown in FIG. 2, when the feeding port cover 64 is closed, the feeding port cover 64 forms an inclined surface in the upper part of the lower unit 12. The inclined surface is inclined downward in the −Z direction, as it extends to the −Y axis direction from an end of the medium receiving tray 18 in the −Y axis direction.

In the present embodiment, when recording is performed in the lower unit 12 onto a medium having a length longer than the length of the medium receiving tray 18 in the medium transport direction, part of the elongated medium outputted onto the medium receiving tray 18 is supported by the feeding port cover 64, which is in the closed state, as well as the medium receiving tray 18 as shown in FIG. 2.

When the feeding port cover 64 is in the open state, as shown in FIG. 3, the medium P can be fed from the rear-side feeding section 62 toward the recording section 24 in the lower unit 12. When the feeding port cover 64 is open, the feeding port cover 64 can support the medium P in an inclined state. Accordingly, the feeding port cover 64, when in the closed state, serves as a medium receiving tray that supports the medium sticking out of the medium receiving tray 18, and, when in the open state, serves as a support tray for a medium fed from the rear-side feeding section 62. Further, the bold line indicated by reference number P2 in FIG. 3 represents a path for the medium P that is fed from the rear-side feeding section 62.

A feed roller 66 and a separation roller 68 are disposed on the downstream side relative to the feeding port cover 64. The medium P set in the rear-side feeding section 62 is nipped between the feed roller 66 and the separation roller 68, and fed into the medium transport path 22 on the downstream side relative to the feed roller 66 and the separation roller 68. Then, the medium P is fed to the recording section 24, in which recording is performed, and outputted onto the medium receiving tray 18 via the curved reversing path 26.

The straight path 28 (FIG. 4) will now be described. In FIG. 1, a cover 70 is disposed on the front surface of the lower unit 12. In the present embodiment, the cover 70 is configured to pivot about the lower part of the cover 70, while the upper part moves as a free end for pivot. The cover 70, when closed on the lower unit 12 (FIG. 1), includes a first cover 72 located on the −Z direction side and a second cover 74 located on the +Z direction side of the first cover 72.

In the present embodiment, the first cover 72 is pivotable relative to the lower unit 12, independently from the second cover 74. Specifically, while the second cover 74 remains closed on the lower unit 12, only the first cover 72 is pivotally rotated to thereby switch from the closed state to the open state (FIG. 4).

As shown in FIG. 4, in the present embodiment, when the first cover 72 is opened by being pivotally rotated to the +Y direction of the lower unit 12, the medium receiving tray 54 can be accessed from the +Y direction side of the lower unit 12. In this state, the medium receiving tray 54 is pivotally rotated in the −Z direction to thereby switch from a guiding position (FIGS. 2 and 3), which is inclined to the +Z direction, to a medium receiving position (FIG. 4), which extends in the Y axis direction, in which the straight path 28 is provided. Accordingly, the medium P can be outputted to the +Y direction of the lower unit 12 with the recorded surface, on which recording has been performed by the recording section 24, being faced in the +Z direction (face-up state). Further, the bold line indicated by reference number P3 in FIG. 4 represents a path for the medium P that is transported along the straight path 28.

Configuration of Upper Unit

With reference to FIGS. 5 to 10, the upper unit 14 which is configured as a scanner is described. The upper unit 14 includes an upper housing 76, a lower housing 78, a cover 80, a document tray 82, and a reading means 84. In the present embodiment, the upper housing 76, the lower housing 78, and the cover 80 are made of a resin material such as ABS resin.

In FIG. 5, the document tray 82 is configured as a rigid member. Specifically, the document tray 82 is configured, for example, as a flat rectangular glass member. In the present embodiment, the glass member constituting the document tray 82 is transparent, and has a strength higher than that of the resin material constituting the upper housing 76 and the lower housing 78. The upper housing 76 has an opening 76a. In the opening 76a, the document tray 82 is disposed.

The cover 80 is mounted on the end of the upper housing 76 in the −Y direction in a manner pivotable relative to the upper unit 14. The cover 80 is configured to cover the document tray 82 when in the closed state, and expose the document tray 82 when in the open state.

In FIGS. 6 and 7, the opening 76a of the upper housing 76 has a first side 76b (long side) extending in the X axis direction at the end of the opening 76a in the +Y direction, a second side 76c (short side) which intersects with the first side 76b at the end of the first side 76b in the −X direction and extends in the Y axis direction, and a third side 76d (short side) which intersects with the first side 76b at the end of the first side 76b in the +X direction and extends in the Y axis direction. Further, the document tray 82 in the present embodiment is configured such that a long side direction of the maximum size of a document placed on the document tray 82 is an apparatus width direction, and a short side direction of the maximum size of a document is an apparatus depth direction. Alternatively, when a document placed on the document tray 82 is read, the apparatus depth direction is defined as a main scan direction, and the apparatus width direction is defined as a sub-scan direction.

In the present embodiment, the intersection between the first side 76b and the second side 76c is defined as a set origin S1 of a medium set on the document tray 82. In the present embodiment, the four sides of the opening 76a is formed as a step raised in the +Z axis direction from the document tray 82 provided in the opening 76a. With this configuration, a document can be placed in position in the document tray 82 when abutted with the respective sides.

As shown in FIGS. 6 and 7, a region W1 on the first side 76b is formed as an inclined surface which is inclined toward the document tray 82 more gradually than the other region on the first side 76b. Similarly, a region W2 on the second side 76c shown in FIG. 6 is formed as an inclined surface which is inclined toward the document tray 82 more gradually than the other region on the second side 76c. Further, the height of the region W1 and the region W2 from the document tray 82 is lower than that of the sides which form the opening 76a.

In the present embodiment, each part (regions W1 and W2) of two sides extending from a corner opposite (+X direction) to the set origin S1 of a document in the X axis direction, that is, the first side 76b and the third side 76d, has a lower height so that the document set on the document tray 82 can be easily taken out.

In FIG. 8, the lower housing 78 is formed as a box-shaped member which is open in the +Z direction. A guide rib 78a extending in the X axis direction is formed in the lower housing 78. The guide rib 78a extends from the bottom of the lower housing 78. As an example, a rack 78b extending along the guide rib 78a is disposed on the +Y direction side of the guide rib 78a. In the present embodiment, the guide rib 78a is disposed on the bottom of the lower housing 78, extending from the bottom of the lower housing 78 along the long side direction of the lower housing 78 in the X axis direction. Accordingly, the rigidity of the lower housing 78 can be increased.

The guide rib 78a engages with the reading means 84. The reading means 84 is provided with a driving source, which is not shown, and a gear 84a which is rotated by a driving force applied by the driving source. The gear 84a meshes with the rack 78b to form a rack and pinion configuration. As the gear 84a rotates, the reading means 84 reciprocates in the X axis direction along the guide rib 78a and the rack 78b. Further, the position of the reading means 84 in the lower housing 78 shown in FIG. 8 represents a stand-by position of the reading means 84.

Further, in FIGS. 9 and 10, a plurality of support ribs 78c (portions filled in black in FIGS. 9 and 10) are formed in a box-shaped lower housing 78. The plurality of support ribs 78c extend from the bottom of the lower housing 78 in the +Z direction, and is configured to support the document tray 82 from the −Z direction side. Specifically, the support ribs 78c are disposed in a rectangular shape, corresponding to the sides of the document tray 82 in the lower housing 78 so as to support the sides of the document tray 82.

The plurality of support ribs 78c are connected to a plurality of auxiliary ribs 78d. The auxiliary ribs 78d have a height lower than that of the support ribs 78c in the Z direction. The auxiliary ribs 78d are connected to the support ribs 78c, and extend from the support ribs 78c in the X axis direction or the Y axis direction as appropriate. Accordingly, when a stress is applied to the support ribs 78c, the support ribs 78c do not easily collapse in the X axis direction or the Y axis direction. Moreover, in the present embodiment, as shown in FIG. 10, the rack 78b is connected to the support rib 78c and the auxiliary rib 78d. Accordingly, the rigidity of the lower housing 78 can be further increased.

Relationship between Upper Unit and Support Section of Lower Unit

As shown in FIGS. 11 to 13, the relationship between the upper unit 14 and the support sections 12a of the lower unit 12 will be described. As shown in FIG. 11, the upper unit 14 is supported at both ends in the X axis direction by the pair of support sections 12a of the lower unit 12.

With reference to FIGS. 12 and 13, more detailed description will be provided. In FIG. 12, the end of the upper unit 14 in the −X direction is supported by the support section 12a disposed on the end of the lower unit 12 in the −X direction. In FIG. 12, a region W3 indicates a support region in which the upper unit 14 is supported by the support section 12a in the X axis direction.

A region W4 indicates a support region in which the document tray 82 is supported by the support ribs 78c of the lower housing 78 in the X axis direction. In the present embodiment, the support region W4 in which the document tray 82 is supported is partially located inside the support region W3 of the support section 12a in the X axis direction. Accordingly, the end of the document tray 82 in the −X axis direction is supported by the support section 12a via the support ribs 78c of the lower housing 78.

In FIG. 13, a region W5 indicates a support region in which the upper unit 14 is supported by the support section 12a in the X axis direction. A region W6 indicates a support region in which the document tray 82 is supported by the support ribs 78c of the lower housing 78 in the X axis direction. In the present embodiment, the support region W6 in which the document tray 82 is supported is located inside the support region W5 of the support section 12a in the X axis direction. Accordingly, the end of the document tray 82 in the +X axis direction is supported by the support section 12a via the support ribs 78c of the lower housing 78.

In the present embodiment, both ends of the document tray 82 in the X axis direction are supported by the support sections 12a via the support ribs 78c. Accordingly, when a load is applied to the document tray 82, the load is transmitted to the support sections 12a via the support ribs 78c. As a result, the upper unit 14 is supported by the support sections 12a, and deformation of the upper unit 14 due to the load applied to the document tray 82 can be reduced.

Further, referring to the support regions W3, W5 of the support sections 12a shown in FIG. 9, the guide rib 78a and the rack 78b are partially located inside the support regions W3 and W5 in the X axis direction. In the present embodiment, the guide rib 78a and the rack 78b are located on the +Y direction side relative to the support regions W3 and W5 in the Y axis direction.

In FIGS. 11 and 12, in the present embodiment, the stand-by position of the reading means 84 in the Y axis direction is set inside the support region W3 of the support section 12a on the +X direction side. As shown in FIG. 8, the reading means 84 extends in the Y axis direction in the lower housing 78. Accordingly, part of the reading means 84 in the Y axis direction is located inside the support region W3 shown in FIG. 9.

In summary of the above description, the printer 10 includes the lower unit 12 having the recording section 24 that performs recording onto the medium P, and an upper unit 14 having the document tray 82 on which a document is placed and the reading means 84 that reads an image in the document placed on the document tray 82, the upper unit 14 being disposed above the lower unit 12, wherein the upper unit 14 is configured such that the short side direction of the document is the Y axis direction and the long side direction is the X axis direction, the lower unit 12 includes the support sections 12a that stand on both ends in the X axis direction to support the ends of the upper unit 14 in the X axis direction, and the document tray 82 included in the upper unit 14 is made of a rigid member and part of the document tray 82 is located above the support sections 12a.

According to the above configuration, since the lower unit 12 includes the support sections 12a that stand on both ends in the X axis direction to support the ends of the upper unit 14 in the X axis direction, and the document tray 82 included in the upper unit 14 is made of a rigid member and part of the document tray 82 is located above the support sections 12a, the rigidity of the document tray 82 is used for supporting the upper unit 14. Accordingly, the upper unit 14 can be appropriately prevented from being deformed while preventing an increase in the number of components.

The upper unit 14 includes a lower housing 78 that houses the reading means 84 and supports the document tray 82, and the lower housing 78 includes the support ribs 78c that support the document tray 82, and the support ribs 78c are disposed between the document tray 82 and the support sections 12a. According to this configuration, a load applied to the document tray 82 can be readily transmitted to the support sections 12a, and deformation of the upper unit 14 can be more appropriately reduced.

The lower housing 78 includes the auxiliary ribs 78d that have a height lower than that of the support ribs 78c and are connected to the support ribs 78c. According to this configuration, the support ribs 78c do not easily collapse, and the document tray 82 can be more reliably supported.

The lower housing 78 includes the guide rib 78a that guides the reading means 84 in the X axis direction and the rack 78b that extends along the guide rib 78a, and at least one of the guide rib 78a and the rack 78b is connected to at least one of the support ribs 78c and the auxiliary ribs 78d. According to this configuration, the lower housing 78 has an improved rigidity, and deformation of the upper unit 14 can be more reliably reduced.

When the stand-by position of the reading means 84 is set at either one of a pair of support sections 12a, for example, the one on the −X axis direction side, and the reading means 84 is located at the stand-by position, at least part of the reading means 84 is located above the support section 12a on the −X axis direction side.

Connection between Upper Unit and Support Section

In FIG. 14, a plurality of engaging sections 78f and a plurality of fastening sections 78g are disposed on the underside of the upper unit 14, that is, an underside 78e of the lower housing 78.

On the other hand, in FIG. 1, an upper member 86 is disposed in the upper part of the lower unit 12. In FIG. 15, the upper member 86 includes a frame-shaped member 86a constituting the top of the lower unit 12, the pair of support sections 12a extending in the +Z direction from both ends of the frame-shaped member 86a in the X axis direction, and a tray section 86b constituting part of the medium receiving tray 18. A notch 86c is disposed on the end of the tray section 86b in the −Y direction and at the center in the X axis direction. A plurality of engaged sections 86d and a plurality of fastened sections 86e are formed on the upper part in the pair of the support section 12a. In the present embodiment, the upper member 86 is integrally formed by a resin material such as ABS resin.

In the present embodiment, the upper unit 14 is mounted on the support sections 12a of the lower unit 12. More specifically, the engaging sections 78f of the upper unit 14 and the engaged sections 86d of the support section 12a are respectively engaged. Further, the fastening sections 78g of the upper unit 14 and the fastened sections 86e of the support section 12a are engaged, followed by fastening by fastening members, which are not shown, so that the upper unit 14 is fixed to the support section 12a, and thus the lower unit 12.

In the present embodiment, after a plurality of engaging sections 78f and a plurality of engaged sections 86d are engaged, the fastening sections 78g and the fastened sections 86e are fastened by fastening members, which are not shown. Accordingly, the upper unit 14 and the lower unit 12 are tightly connected to each other, and the number of fastening members used for connection can be reduced to thereby reduce the cost.

Connection between Upper Member and Frame of Lower Unit

In FIGS. 16 and 17, the lower unit 12 includes the upper member 86, a right frame 88, a left frame 90, and a center frame 92. In the present embodiment, the right frame 88 and the left frame 90 are connected to each other at the ends on the +Y axis direction via the center frame 92.

In FIG. 16, the upper member 86 is connected to the left frame 90, for example, at two connecting sections 94, and is positioned to the left frame 90. Further, the upper member 86 is connected to the center frame 92 at connecting section 96, and is positioned to the center frame 92.

In FIG. 17, the upper member 86 is connected to the right frame 88, for example, at two connecting sections 98, and is positioned to the right frame 88. Further, the upper member 86 is connected to the center frame 92 at connecting section 100, and is positioned to the center frame 92.

As shown in FIGS. 16 and 17, in the lower unit 12, the upper member 86, the right frame 88, the left frame 90 and the center frame 92 are connected to each other to form a box-shaped structure. Accordingly, the rigidity of the lower unit 12 can be increased. In addition, since the connecting sections 94 to the left frame 90 and the connecting sections 98 to the right frame 88 are disposed on the −Z direction side of the pair of the support sections 12a of the upper member 86, the right frame 88 and the left frame 90 support under the support section 12a when a load applied from the upper unit 14 is supported by the support section 12a. Accordingly, the rigidity of the printer 10 can be further increased. Moreover, the respective connecting sections 94, 96, 98 and 100 in the present embodiment are fastened by the fastening members 110 (FIG. 20). In the present embodiment, the fastening member 110 is provided as, for example, screw, bolt, or the like.

Notch of Upper Member

With reference to FIGS. 11, 15 and 18, the notch 86c will be described. In the present embodiment, the feeding port cover 64 is pivotally mounted on the −Y direction side of the tray section 86b of the upper member 86. As shown in FIGS. 2 and 11, when the printer 10 is viewed from the front (viewed from the +Y direction side) with the feeding port cover 64 closed, the feeding port cover 64 is hidden behind the tray section 86b and cannot be easily observed.

On the other hand, as shown in FIG. 3, when the feeding port cover 64 is pivotally rotated in the −Y direction relative to the upper member 86 so as to support the medium, a free end of the feeding port cover 64 comes to a higher position in the Z axis direction than the tray section 86b. Accordingly, the feeding port cover 64 can be recognized when the printer 10 is viewed from the front. In the present embodiment, since the notch 86c is provided on the tray section 86b, the height of the notch 86c in the Z axis direction is lowered, allowing for easy view of the feeding port cover 64.

As a result, whether the feeding port cover 64 is in the open state or the closed state can be easily recognized. Moreover, when the feeding port cover 64 is switched from the closed state to the open state, a user can insert his/her finger into the notch 86c to facilitate switching of the states of the feeding port cover 64.

Configuration of Support Section

With reference to FIG. 19, a configuration of the support sections 12a will be described. In FIG. 19, a space 12b is formed inside the support sections 12a in +X axis direction. In the present embodiment, a cable 102 is disposed in the space 12b. The cable 102 electrically connects, for example, a circuit board provided in the lower unit 12, which is not shown, and the reading means 84 in the upper unit 14, the operation section 16, and the like.

In the present embodiment, the space 12b in the support section 12a can be used as a wiring space for the cable 102 electrically connecting the lower unit 12 and the upper unit 14. Accordingly, there is no need of separately providing a space for wiring the cable 102, and thus the apparatus can be down-sized.

In the pair of the support sections 12a, the space 12b in the support section 12a on the +X axis direction side allows the cable 102 for electrically connecting the lower unit 12 and the upper unit 14 to pass therethrough. According to this configuration, in the pair of the support sections 12a, the space 12b in the support section 12a on the +X axis direction side is used as a space that allows the cable 102 for electrically connecting the lower unit 12 and the upper unit 14 to pass therethrough, and thus the apparatus can be down-sized.

Modifications of Embodiment (1) In the present embodiment, the guide rib 78a and the rack 78b are located on the +Y direction side relative to the support regions W3 and W5 in the Y axis direction. However, instead of this configuration, the guide rib 78a and the rack 78b may be positioned inside the support regions W3 and W5.

The lower housing 78 includes the guide rib 78a that guides the reading means 84 in the X axis width direction and the rack 78b which extends along the guide rib 78a, and at least one of part of the guide rib 78a and part of the rack 78b is located above the support section 12a. According to this configuration, the rigidity of the guide rib 78a or the rack 78b is used for supporting the upper unit 14. Accordingly, deformation of the upper unit 14 can be more appropriately prevented.

(2) In the present embodiment, the upper unit 14 and the lower unit 12 are connected by being fastened by the fastening members 110 at each of the connecting sections 94, 96, 98 and 100. However, instead of this configuration, connection by snap fitting or the like may also be used.

(3) In the present embodiment, the document tray 82 is provided as a glass member, which is a rigid member having strength. However, the document tray 82 may also be formed by, for example, a resin material which is transparent, such as acrylic, and has strength higher than that of the resin material that forms the upper housing 76 and the lower housing 78.

(4) In the present embodiment, the space 12b in the support section 12a houses the cable 102. However, as shown in FIG. 20, the space 12b may also house other components. Specifically, according to an example of modification, as shown in FIG. 20, the space 12b may be configured to house a driving motor 104, a driving force transmission means 106a with a plurality of gears for transmitting driving force to a driving target in the upper unit 14, and a detection means 108 such as an encoder sensor for detecting a rotation rate of the driving motor 104. Further, a driving force transmission target in the upper unit 14 by the driving force transmission means 106 may be, for example, the reading means 84 or an auto document feeder (ADF) that can be disposed in the upper unit 14.

Alternatively, a driving force transmission target by the driving force transmission means 106 may be a component in the lower unit 12. For example, a driving force transmission target may be at least one of the pick-up roller 34, the reversing roller 40, the transport roller pair 44, the output roller pair 52, the feed roller 66, and the carriage unit 46. Further, the space 12b may be configured to house a detection means such as an encoder sensor, a circuit board for controlling the upper unit 14 and the lower unit 12, a driving force transmission means for transmitting a driving force from the lower unit 12 to the upper unit 14, or from the upper unit 14 to the lower unit 12, a waste liquid containing section, a waste liquid absorbing material, or the like.

In the pair of the support sections 12a, the space 12b in the support section 12a on the +X axis direction side houses the driving motor 104 that drives a movable section of at least one of the lower unit 12 and the upper unit 14. According to this configuration, in the pair of the support sections 12a, the space 12b in the support section 12a on the +X axis direction side is used as a space that houses the driving motor 104, and thus the apparatus can be downsized.

(4) As shown in FIG. 21, a cover 12c which is slidable in the Y axis direction or pivotally rotatable relative to the support section 12a may be provided on the support section 12a located on the −X axis direction side so that a user can access the space 12b when the cover 12c is opened. According to this configuration, the space 12b may house, for example, an ink bottle 112, an ink cartridge, or other accessories or consumables for the printer 10.

According to this configuration, the space 12b of the support section 12a on the −X axis direction side can be used as a housing space for articles for the printer 10, and thus convenience of the printer 10 can be improved. In particular, when the ink bottle 112 is housed, the ink bottle 112 for refilling ink can be prepared in advance in the neighborhood of the ink housing section 114 (FIG. 23), which is described later, and thus usability of the apparatus can be improved. Similarly, in the case of on-carriage type that mounts the ink cartridge on the carriage unit 46, an ink cartridge for replacement can be prepared in advance in the neighborhood of the carriage unit 46, and thus convenience of the printer 10 can be improved.

In the pair of the support sections 12a, the space 12b in the support section 12a on the −X axis direction side has a space for housing articles. According to this configuration, in the pair of the support sections 12a, the space 12b in the support section 12a on the −X axis direction side is used as a space that houses articles, and thus the space 12b inside the support section 12a can be effectively used.

Ink Housing Section

With reference to FIGS. 22 and 23, an access restriction means to the ink housing section 114 will be described. In FIGS. 22 and 23, the ink housing section 114 is disposed on the end of the lower unit 12 in the +Y axis direction at a position in the −X axis direction.

In the present embodiment, a cover 116 is disposed above the ink housing section 114 of the lower unit 12. The cover 116 is mounted on the upper member 86 in a pivotally rotatable manner. The cover 116 is configured to cover the ink housing section 114 when it is in the closed state (FIG. 22), and expose the ink housing section 114 to allow access to the ink housing section 114 when it is in the open state (FIG. 23). The cover 116 is provided with a latch section 116a latched by a lock 118, which is described later.

As shown in FIG. 23, a lock housing section 12d is disposed at a position corresponding to a region in which the ink housing section 114 is disposed in the lower unit 12. The lock housing section 12d is formed as a recess with a size that can accommodate the lock 118. In the lock housing section 12d, a latch section 12e which is latched by the lock 118 is disposed.

As shown in FIG. 1, when the second cover 74 is closed relative to the lower unit 12, the lock housing section 12d is covered with the second cover 74. As shown in FIG. 22, when the second cover 74 is open relative to the lower unit 12, the lock housing section 12d is exposed to allow access to the lock housing section 12d. Although the first cover 72 is shown in FIG. 22 closed relative to the lower unit 12, the first cover 72 is configured to open together with the second cover 74 when the second cover 74 is open relative to the lower unit 12.

In FIG. 22, the lock 118 is latched on the latch section 116a and the latch section 12e, and in a locked state. For example, the lock 118 is provided as a padlock. In this state, the cover 116 cannot be opened, and the ink housing section 114 cannot be accessed. Accordingly, unintended access to the ink housing section 114 can be restricted.

In FIG. 22, when the lock 118 is unlocked and removed from the latch section 116a and the latch section 12e, the cover 116 can be pivotally rotated and opened. As shown in FIG. 23, when the cover 116 is opened relative to the lower unit 12, the ink housing section 114 can be accessed to enable ink refilling operation or the like.

Clutch Mechanism of Feed Roller

With reference to FIGS. 24 to 29, a clutch mechanism 120 that regulate rotation of the feed roller 66 (FIGS. 2 and 3) will be described. In FIG. 24, the clutch mechanism 120 is disposed in the lower unit 12 and includes a driving gear 122 mounted on one end of a rotation shaft 66a of the feed roller 66, a clutch switching gear 124 that meshes with the driving gear 122, a clutch member 126, a holder member 128 (FIG. 28), and a pressing member 130 (FIG. 28).

In FIGS. 17 and 25, a meshing section 88a and a bearing 88b are disposed in the right frame 88. As shown in FIG. 25, the meshing section 88a has teeth shapes arranged at equal intervals in the circumferential direction. The bearing 88b is configured to receive one end of the rotation shaft 66a of the feed roller 66, although not shown in the figure.

In FIG. 26, the clutch switching gear 124 includes a gear section 124a that meshes with the driving gear 122, an insertion section 124b, and a pair of switching sections 124c. The insertion section 124b extends from the gear section 124a in the rotation axis direction of the gear section 124a. The pair of switching sections 124c each extend in the radius direction at the end of the insertion section 124b in the rotation axis direction. The insertion section 124b has a recess 124d inside to receive the holder member 128.

As shown in FIGS. 24 and 27, the clutch member 126 is formed as a disk-shaped member, and has gear teeth 126a provided at an equal interval in the circumferential direction on a surface on one side of the clutch member 126, which faces the right frame 88. The gear teeth 126a are capable of meshing with the teeth shapes of the meshing section 88a of the right frame 88.

The other side of the clutch member 126 is configured as a recess 126b that can receive the insertion section 124b of the clutch switching gear 124. Further, a pair of guiding sections 126c that engage with a pair of switching sections 122c are disposed in the recess 126b. The guiding section 126c has a flat section 126d and an inclined surface 126e.

In FIG. 28, the insertion section 124b of the clutch switching gear 124 is inserted into the recess 126b of the clutch member 126. In the recess 124d of the insertion section 124b of the clutch switching gear 124, the holder member 128 is received. The pressing member 130 is disposed between the holder member 128 and the clutch member 126. In the present embodiment, the pressing member 130 is provided as, for example, a coil spring. The pressing member 130 presses the clutch member 126 toward the right frame 88 so that the gear teeth 126a and the teeth shapes of the meshing section 88a of the right frame 88 mesh with each other.

In FIG. 29, when the feed roller 66 is in a rotation stop state, the switching sections 124c of the clutch switching gear 124 is positioned in the flat section 126d in the guiding section 126c of the clutch member 126 in the circumferential direction. In this state, the gear teeth 126a of the clutch member 126 and the teeth shapes of the meshing section 88a of the right frame 88 mesh with each other, and rotation of the clutch member 126 is regulated. That is, rotation of the clutch switching gear 124, the driving gear 122, and the rotation shaft 66a of the feed roller 66 are also regulated, and thus rotation of the feed roller 66 is also regulated.

Then, as the feed roller 66 in FIG. 3 rotates in the counterclockwise direction in FIG. 3 to feed the medium P, the rotation shaft 66a of the feed roller 66 and the driving gear 122 rotate. This rotation causes the clutch switching gear 124 to rotate. Accordingly, the switching sections 124c of the clutch switching gear 124 which is inserted in the guiding section 126c of the clutch member 126 moves from the flat section 126d to the inclined surface 126e in the circumferential direction. As a result, the switching sections 124c comes into contact with the inclined surface 126e, and is pushed up onto the inclined surface 126e.

Accordingly, the clutch member 126 resists a pressing force by the pressing member 130, and is displaced in the direction in which the clutch member 126 is separated from the right frame 88, that is, in the −X axis direction. Further, as the feed roller 66 continues to rotate, the switching sections 124c move along the inclined surface 126e, and the clutch member 126 moves away from the right frame 88 by a distance L1 (FIG. 29). Accordingly, meshing between the gear teeth 126a of the clutch member 126 and the teeth shapes of the meshing section 88a of the right frame 88 is released, rotation regulation of the feed roller 66 is released, and the feed roller 66 continues to rotate in the direction to feed the medium P (counterclockwise direction in FIG. 3).

On the other hand, when rotation of the feed roller 66 stops while meshing between the gear teeth 126a and the teeth shapes of the meshing section 88a of the right frame 88 are released, pressing force of the pressing member 130 is applied to the clutch member 126 to rotate the clutch member 126 thereby allowing the switching sections 124c to move from a state in contact with the inclined surface 126e to a state located in the flat section 126d. Accordingly, the clutch member 126 moves in the direction (+X axis direction) in which it abuts the meshing section 88a of the right frame 88 by a pressing force of the pressing member 130.

Accordingly, the gear teeth 126a and the teeth shapes of the meshing section 88a of the right frame 88 again mesh with each other, and rotation of the feed roller 66 is regulated. Further, rotation direction of the feed roller 66 in which meshing between the gear teeth 126a and the teeth shape of the meshing section 88a of the right frame 88 is released is only the counterclockwise direction in FIG. 3, that is, the feed direction of the medium P. Accordingly, rotation of the feed roller 66 in the counter-rotation direction (direction in which the medium P is fed back to the upstream side in the feed direction) is regulated.

Here, in the present embodiment, deskewing operation for removing skew of the medium in the transport direction is performed to the medium P that has been fed from the feed roller 66 to the transport roller pair 44, by rotating the transport roller pair 44 in the counter-rotation direction while rotation of the feed roller 66 stops. In the present embodiment, if the driving force is not transmitted to the feed roller 66, the feed roller 66 is regulated so as not to rotate in counter-rotation direction. Accordingly, when deskewing of the medium P is performed by the transport roller pair 44, counter-rotation of the feed roller 66 due to being pushed by the medium P can be prevented, and thus deskewing of the medium P can be reliably performed.

Further, in the present embodiment, the lower unit 12 and the upper unit 14 according to the invention are applied to an ink jet printer which is an example of the recording apparatus. However, they can also be applied to other liquid ejecting apparatuses in general. The liquid ejecting apparatus described herein is not limited to recording apparatuses such as printers, copy machines and facsimile machines that use an ink jet recording head and perform recording by ejecting ink from the recording head onto a recording medium, and includes apparatuses that eject liquid substituting for ink according to the application from a liquid ejecting head which corresponds to the ink jet recording head onto an ejection target medium which corresponds to the recording medium so as to attach the liquid onto the ejection target medium.

In addition to the aforementioned recording heads, the liquid ejecting head includes color material ejection heads used for manufacturing color filters for liquid crystal displays and the like, electrode material (electrically conductive paste) ejection heads used for manufacturing electrodes for organic EL displays, field emission displays (FEDs) and the like, bioorganic ejection heads used for manufacturing biochips, and sample ejection heads which are micropipettes.

It should be noted that the invention is not limited to the above embodiments. Regardless to say, various modifications are contemplated within the scope of the invention as defined in the appended claims, and these should be included in the scope of the invention.

The entire disclosure of Japanese Patent Application No. 2017-251966, filed Dec. 27, 2017 is expressly incorporated by reference herein.

What is claimed is:

1. A recording apparatus comprising:
a lower unit having a recording section that performs recording onto a medium; and
an upper unit having a document tray on which a document is placed and a reading means that reads an image in the document placed on the document tray, the upper unit being disposed above the lower unit, wherein:
the upper unit is configured such that an apparatus depth direction is a main scan direction for reading the image in the document and an apparatus width direction is a sub-scan direction for reading the image in the document,
the lower unit includes support sections that stand upward on both ends in the apparatus width direction to support both ends of the upper unit in a long side direction,
the document tray included in the upper unit is made of a rigid member and a part of the document tray is located above the support sections,
the upper unit includes a lower housing that houses the reading means and supports the document tray,
the lower housing includes a guide rib that guides the reading means in the apparatus width direction and a rack that extends along the guide rib, and
at least one of a part of the guide rib or a part of the rack is located above the support sections.

2. The recording apparatus according to claim 1, wherein:
the lower housing includes a support rib that supports the document tray, and the support rib is interposed between the document tray and the support sections.

3. The recording apparatus according to claim 1, wherein a stand-by position of the reading means is set in at least one of a pair of the support sections, and at least part of the reading means is located above the support sections when the reading means is in the stand-by position.

4. The recording apparatus according to claim 1, wherein a cable that electrically connects the lower unit and the upper unit is disposed in at least one of the pair of the support sections.

5. The recording apparatus according to claim 1, wherein a housing space for an article is provided in at least one of the pair of the support sections.

6. The recording apparatus according to claim 1, wherein a motor that drives a movable section of at least one of the lower unit and the upper unit is disposed in at least one of the pair of the support sections.

7. The recording apparatus according to claim 1, wherein:
the recording section includes an ink jet recording head which ejects an ink onto the medium, and
the lower unit includes an ink housing section which houses the ink and which is disposed on an end of the lower unit.

8. The recording apparatus according to claim 7, wherein:
the upper unit includes an operation section which is configured to operate a reading operation and which is disposed on a front side of the upper unit, and
the operation section is disposed on an opposite side from the ink housing section in a front view of the recording apparatus.

9. A recording apparatus comprising:
a lower unit having a recording section that performs recording onto a medium; and
an upper unit having a document tray on which a document is placed and a reading means that reads an image in the document placed on the document tray, the upper unit being disposed above the lower unit, wherein:
the upper unit is configured such that an apparatus depth direction is a main scan direction for reading the image in the document and an apparatus width direction is a sub-scan direction for reading the image in the document,
the lower unit includes support sections that stand upward on both ends in the apparatus width direction to support both ends of the upper unit in a long side direction,
the document tray included in the upper unit is made of a rigid member and a part of the document tray is located above the support sections,
the upper unit includes a lower housing that houses the reading means and supports the document tray,
the lower housing includes a support rib that supports the document tray,
the support rib is interposed between the document tray and the support sections, and
the lower housing includes an auxiliary rib having a height lower than a height of the support rib and is connected to the support rib.

10. The recording apparatus according to claim 9, wherein:
the lower housing includes a guide rib that guides the reading means in the apparatus width direction and a rack that extends along the guide rib, and
at least one of the guide rib or the rack is connected to at least one of the support rib or the auxiliary rib.

11. The recording apparatus according to claim 9, wherein:
the recording section includes an ink jet recording head which ejects an ink onto the medium, and
the lower unit includes an ink housing section which connects to the recording section and which is disposed on an end of the lower unit.

12. The recording apparatus according to claim 11, wherein:
the upper unit includes an operation section which is configured to operate a reading operation and which is disposed on a front side of the upper unit, and
the operation section is disposed on an opposite side from the ink housing section in a front view of the recording apparatus.

* * * * *